US009630631B2

(12) United States Patent
Alaniz et al.

(10) Patent No.: US 9,630,631 B2
(45) Date of Patent: Apr. 25, 2017

(54) SYSTEM AND METHOD FOR DYNAMIC IN-VEHICLE VIRTUAL REALITY

(71) Applicant: Honda Motor Co., Ltd., Tokyo (JP)

(72) Inventors: Arthur Alaniz, Mountain View, CA (US); Joseph Whinnery, Scotts Valley, CA (US); Robert Wesley Murrish, Santa Clara, CA (US); Michael Eamonn Gleeson-May, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/541,364

(22) Filed: Nov. 14, 2014

(65) Prior Publication Data

US 2015/0100179 A1  Apr. 9, 2015

Related U.S. Application Data

(63) Continuation-in-part of application No. 14/455,020, filed on Aug. 8, 2014, which is a continuation-in-part of application No. 14/177,841, filed on Feb. 11, 2014.

(Continued)

(51) Int. Cl.
*G06T 19/00* (2011.01)
*B60W 50/14* (2012.01)
(Continued)

(52) U.S. Cl.
CPC ............. *B60W 50/14* (2013.01); *A63F 13/00* (2013.01); *B60W 50/10* (2013.01);
(Continued)

(58) Field of Classification Search
CPC ...... G06T 19/006; G06F 3/011; B60W 50/10; B60W 50/14; A63F 13/00; B62D 15/029; G02B 27/017
(Continued)

(56) References Cited

U.S. PATENT DOCUMENTS 5,583,526 A  12/1996  Socks et al.
6,004,243 A  12/1999  Ewert
(Continued)

FOREIGN PATENT DOCUMENTS

DE  102009027026  12/2010
DE  102009027026 A1 * 12/2010 ........... B62D 15/029

OTHER PUBLICATIONS

Office Action of U.S. Appl. No. 14/291,854 dated Jun. 18, 2015, 39 pages.

(Continued)

*Primary Examiner* — Jacinta M Crawford
*Assistant Examiner* — Terrell Robinson
(74) *Attorney, Agent, or Firm* — Rankin, Hill & Clark LLP

(57) ABSTRACT

A computer-implemented method and system for in-vehicle dynamic virtual reality includes determining a spatial environment around a vehicle and one or more maneuver paths for the vehicle in the spatial environment. The method includes updating a virtual view based on the spatial environment and the maneuver paths. Updating the virtual view includes augmenting one or more components of a virtual world model to indicate the spatial environment and the maneuver paths. The virtual view is rendered to an output device. The method includes generating a vehicle maneuver request for the vehicle. The vehicle maneuver request includes at least a desired vehicle maneuver and the vehicle maneuver request is based at least in part on the spatial environment. The method includes controlling one or more vehicle systems of the vehicle based on the vehicle maneuver request.

19 Claims, 13 Drawing Sheets

Related U.S. Application Data

(60) Provisional application No. 61/886,240, filed on Oct. 3, 2013.

(51) Int. Cl.
| | | |
|---|---|---|
| *A63F 13/00* | (2014.01) | |
| *B60W 50/10* | (2012.01) | |
| *B62D 15/02* | (2006.01) | |
| *G06F 3/01* | (2006.01) | |
| *G02B 27/01* | (2006.01) | |

(52) U.S. Cl.
CPC ......... *B62D 15/029* (2013.01); *G02B 27/017* (2013.01); *G06F 3/011* (2013.01)

(58) Field of Classification Search
USPC .......................................................... 345/633
See application file for complete search history.

(56) References Cited

U.S. PATENT DOCUMENTS

| | | | |
|---|---|---|---|
| 6,005,578 A | 12/1999 | Cole | |
| 6,116,744 A | 9/2000 | Batterman | |
| 6,441,748 B1 | 8/2002 | Takagi | |
| 7,301,547 B2 | 11/2007 | Martins et al. | |
| 7,551,103 B2* | 6/2009 | Schofield ............... | B60Q 1/346 340/435 |
| 7,693,702 B1 | 4/2010 | Kerner et al. | |
| 8,264,505 B2 | 9/2012 | Bathiche et al. | |
| 8,310,537 B2 | 11/2012 | Marti et al. | |
| 2002/0141618 A1 | 10/2002 | Ciolli | |
| 2006/0262140 A1 | 11/2006 | Kujawa et al. | |
| 2008/0122737 A1 | 5/2008 | Lea et al. | |
| 2008/0310707 A1 | 12/2008 | Kansal et al. | |
| 2009/0005961 A1 | 1/2009 | Grabowski et al. | |
| 2009/0112452 A1 | 4/2009 | Buck | |
| 2010/0256836 A1* | 10/2010 | Mudalige ................. | G08G 1/22 701/2 |
| 2010/0292886 A1 | 11/2010 | Szczerba et al. | |
| 2011/0055726 A1 | 3/2011 | Hamilton, II et al. | |
| 2011/0193773 A1 | 8/2011 | Uphill et al. | |
| 2012/0154441 A1 | 6/2012 | Kim | |
| 2012/0173069 A1* | 7/2012 | Tsimhoni ............. | G01C 21/365 701/25 |
| 2012/0224060 A1 | 9/2012 | Gurevich et al. | |
| 2013/0076787 A1 | 3/2013 | Mathieu et al. | |
| 2013/0083061 A1 | 4/2013 | Mishra et al. | |
| 2013/0147840 A1 | 6/2013 | Seder et al. | |
| 2013/0162632 A1 | 6/2013 | Varga et al. | |
| 2013/0188258 A1* | 7/2013 | Mathieu ................. | G08G 1/167 359/630 |
| 2013/0249942 A1* | 9/2013 | Green ....................... | G06F 3/14 345/633 |

OTHER PUBLICATIONS

"Motion and Spatiality in a Gaming Situation Enhancing Mobile Computer Games with the Highway Experience", Liselott Brunnberg & Oskar Juhlin.
Office Action of U.S. Appl. No. 14/177,841 dated Jun. 5, 2015, 36 pages.
Search Report of DE Application No. 102014220053.9 dated May 7, 2015, 12 pages.
Search Report of DE Application No. 102014220053.9 dated May 7, 2015, 8 pages (English Translation).
Office Action of U.S. Appl. No. 14/177,841 dated Oct. 1, 2015, 43 pages.
Office Action of U.S. Appl. No. 14/455,020 dated Sep. 10, 2015, 57 pages.
Office Action of U.S. Appl. No. 14/328,148 dated Sep. 8, 2015, 45 pages.
Office Action of U.S. Appl. No. 14/291,854 dated Oct. 21, 2015, 51 pages.
Office Action of U.S. Appl. No. 14/328,148 dated Jan. 14, 2016, 61 pages.
Office Action of U.S. Appl. No. 14/455,020 dated Feb. 12, 2016, 62 pages.
Office Action of U.S. Appl. No. 14/177,841 dated Jun. 20, 2016, 36 pages.
Office Action of U.S. Appl. No. 14/291,854 dated Jun. 20, 2016, 44 pages.
Office Action of U.S. Appl. No. 14/328,148 dated Jun. 30, 2016, 48 pages.
Office Action of U.S. Appl. No. 14/455,020 dated Aug. 11, 2016.
Office Action of U.S. Appl. No. 14/455,020 dated Jan. 27, 2017, 23 pages.
Office Action of U.S. Appl. No. 15/359,138 dated Feb. 3, 2017, 39 pages.

\* cited by examiner

SYSTEM AND METHOD FOR DYNAMIC IN-VEHICLE VIRTUAL REALITY

RELATED APPLICATIONS

This disclosure is a continuation-in-part of U.S. patent application Ser. No. 14/455,020 filed on Aug. 8, 2014, which is a continuation-in-part of U.S. patent application Ser. No. 14/177,841 filed on Feb. 11, 2014, which claims priority to U.S. Provisional Application Ser. No. 61/886,240 filed on Oct. 3, 2013, each of which are expressly incorporated herein by reference.

BACKGROUND

Truly immersive virtual reality and augmented reality systems create an environment that submerge the perceptual system of a user in computer-generated stimuli (e.g., a virtual world and/or a virtual view). Typically, these immersive systems captivate the senses of the user while blocking out stimuli from the physical world. The virtual world can be altered as a result of an input from the user and/or an interaction of the user with the virtual world.

Although, a goal of these systems is to create an immersive environment, the physical world can still be used to provide a context for the immersive environment. In particular, it is important to consider the environment and context of the user. For example, in the context of a user in a vehicle, immersive virtual reality and augmented reality systems can consider information about the user, the vehicle and the user in relation to the vehicle. This information can be used to generate an immersive environment that is customized to the user and the user's environment and can allow the user to perceive the immersive environment comfortably.

BRIEF DESCRIPTION

According to one aspect, computer-implemented method for in-vehicle dynamic virtual reality includes determining a spatial environment around a vehicle and one or more maneuver paths for the vehicle in the spatial environment. The method includes updating a virtual view based on the spatial environment and the maneuver paths. Updating the virtual view includes augmenting one or more components of a virtual world model to indicate the spatial environment and the maneuver paths. The method includes rendering the virtual view to an output device. The method includes generating a vehicle maneuver request for the vehicle, wherein the vehicle maneuver request includes at least a desired vehicle maneuver and the vehicle maneuver request is based at least in part on the spatial environment. The method includes controlling one or more vehicle systems of the vehicle based on the vehicle maneuver request.

According to another aspect, a computing system for in-vehicle dynamic virtual reality includes an output device for displaying a virtual view and a processor operably connected to the output device and a vehicle. The processor include a virtual reality data module. The virtual reality data module determines a spatial environment around a vehicle and one or more maneuver paths for the vehicle in the spatial environment. The processor includes a dynamic virtual reality module. The dynamic virtual reality module updates the virtual view based on the spatial environment and the maneuver paths. Updating the virtual view includes augmenting one or more components of a virtual world model to indicate the spatial environment based on the available maneuver paths. The processor includes a rendering module. The rendering module renders the virtual view to the output device. The dynamic virtual reality module generates a vehicle maneuver request for the vehicle. The vehicle maneuver request includes at least a desired vehicle maneuver and the vehicle maneuver request is based at least in part on the spatial environment around the vehicle, and the dynamic virtual reality module controls one or more vehicle systems of the vehicle based on the vehicle maneuver request.

According to another aspect, a non-transitory computer-readable storage medium storing instructions that, when executed by a computer, causes the computer to perform a method. The method includes determining a spatial environment around a vehicle and one or more maneuver paths for the vehicle in the spatial environment. The method includes updating a virtual view based on the spatial environment and the maneuver paths. Updating the virtual view includes augmenting one or more components of a virtual world model to indicate the spatial environment based on the maneuver paths and rendering the virtual view to an output device. The method includes generating a vehicle maneuver request for the vehicle. The vehicle maneuver request includes at least a desired vehicle maneuver and the vehicle maneuver request is based at least in part on the spatial environment. The method includes controlling one or more vehicle systems of the vehicle based on the vehicle maneuver request.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
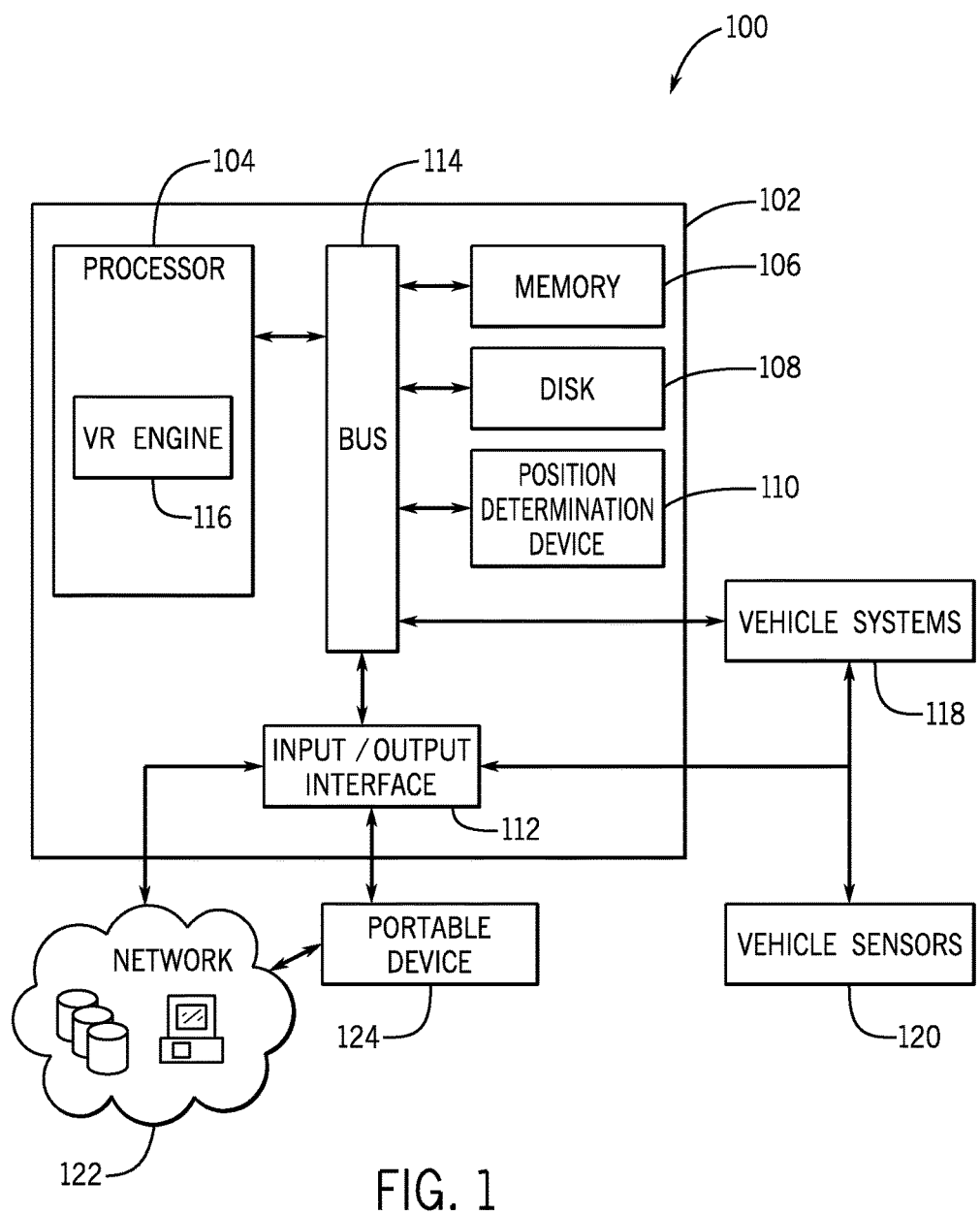
FIG. 1 is a schematic view of an exemplary operating environment for dynamic in-vehicle virtual reality systems and methods according to one aspect of the present disclosure.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, and a set of data stores and/or methods for accessing and/or manipulating those data stores.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device," as used herein, is a computing device typically having a display screen with user input (e.g., touch, keyboard) and a processor for computing. Portable devices include, but are not limited to, handheld devices, mobile devices, smart phones, laptops, tablets, and e-readers. In some embodiments, a "portable device" could refer to a remote device that includes a processor for computing and/or a communication interface for receiving and transmitting data remotely. As will be discussed herein, the portable device can include on-vehicle devices and off-vehicle devices.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system," as used herein can include, but are not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user, for example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, ear buds, headphones, personal wellness devices, and medical implants.

I. Exemplary System for Dynamic in-Vehicle Virtual Reality

Figure 2:
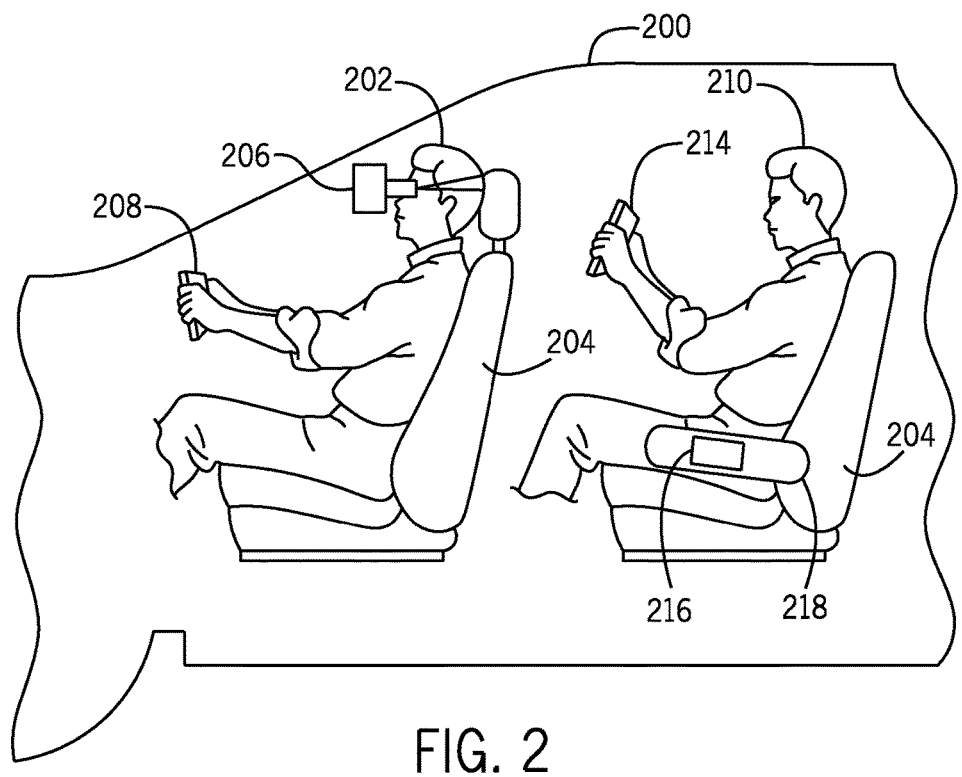
FIG. 2 is a schematic view of an exemplary vehicle and exemplary vehicle occupants implementing in-vehicle virtual reality systems and methods according to one or more aspects of the present disclosure.

Referring now to the drawings, wherein the showings are for purposes of illustrating one or more exemplary embodiments and not for purposes of limiting same, FIG. 1 is a schematic view of an operating environment 100 for implementing dynamic in-vehicle virtual reality systems and methods according to an exemplary embodiment. The components of environment 100, as well as the components of other systems, hardware architectures, and software architectures discussed herein, can be combined, omitted, or organized into different architectures for various embodiments. Further, the components of the operating environment 100 can be implemented with or associated with a vehicle. For example, FIG. 2 illustrates a vehicle 200 implementing dynamic in-vehicle virtual reality systems and methods.

In the illustrated embodiment of FIG. 1, the environment 100 of FIG. 1 includes a computing device 102 with provisions for processing, communicating, and interacting with various components of a vehicle (e.g., the vehicle 200, FIG. 2) and other components of the environment 100. In one embodiment, the computing device 102 can be implemented with the vehicle 200 (FIG. 2), for example, as part of a telematics unit, a head unit, a navigation unit, an infotainment unit, an electronic control unit, among others. In other embodiments, the computing device 102 can be implemented remotely from the vehicle 102, for example, with a portable device, an input/output device or at a device connected via a network, as will be described in further detail herein. It is understood that the functions and components of the computing device 102, including a processor 104, can be modified and/or organized into different architectures for these various implementations discussed above.

Generally, the computing device 102 includes the processor 104, a memory 106, a disk 108, a position determination device 110 and an input/output (I/O) interface 112, which are each operably connected for computer communication via a bus 114 (e.g., a Controller Area Network (CAN) or a Local Interconnect Network (LIN) protocol bus) and/or other wired and wireless technologies. The I/O interface 112 provides software and hardware to facilitate data input and output between the components of the computing device 102 and other components, networks and data sources, which will be described herein. Additionally, as will be described in further detail with the systems and the methods discussed herein, the processor 104 includes a virtual reality (VR) engine 116 suitable for providing a dynamic in-vehicle virtual reality environment to a user (e.g., a vehicle occupant (FIG. 2)) facilitated by the components of the environment 100.

In some embodiments, the computing device 102 and/or the processor 104 can include integrated sensors and/or sensor engines (not shown). Further, portable devices, discussed herein, can also include similar integrated sensors and/or sensor engines. Integrated sensors can include, but are not limited to, micro electro-mechanical systems (MEMS) sensors, inertial measurement unit (IMU) sensors, an accelerometer, a magnetometer, a gyroscope, ambient light sensors, proximity sensors, pressure sensors, temperature sensors, humidity sensors, color (RGB) sensors, biometric sensors (e.g., heart rate, finger print), among others. These sensors provide information about the associated device and can be used as inputs for the methods and systems discussed herein.

Referring again to FIG. 1, the computing device 102 is also operably connected for computer communication (e.g., via the bus 114 and/or the I/O interface 112) to one or more vehicle systems 118. Vehicle systems can include, but are not limited to, any automatic or manual systems that can be used to enhance the vehicle, driving, operation thereof, and/or safety. The vehicle systems 118 include and/or are operably connected for computer communication to various vehicle sensors 120, the vehicle sensors 120 providing, and/or sensing information associated with the vehicle, the vehicle environment, and/or the vehicle systems 118. The vehicle sensors 120, can include, but are not limited to, vehicle state sensors, vehicle system state sensors, proximity sensors, vision sensors, audio sensors, motion sensors, and other sensors. The vehicle sensors 120 can also include sensors of the position determination device 110, for example global positioning system (GPS) sensors, inertial measurement unit sensors (IMU), atomic clocks, among other position and motion sensors. Other specific vehicle system sensors can include, but are not limited to, vehicle speed sensors, accelerator pedal sensors, brake sensors, throttle position sensors, wheel sensors, anti-lock brake sensors, camshaft sensors, among others. Further, it is understood that the vehicle sensors and/or other integrated sensors discussed above can be used for vehicle-to-vehicle (V2V) and/or vehicle-to-infrastructure (V2X) communication technologies.

The vehicle sensors 120 are operable to sense a measurement of data associated with the vehicle, the vehicle environment, the vehicle systems 118, and/or occupants of the vehicle, and generate a data signal indicating said measurement of data. These data signals can be converted into other data formats (e.g., numerical) and/or used by the vehicle systems 118 and/or the computing device 102 to generate other data metrics and parameters. In one embodiment, the computing device 102 and components thereof can access and/or receive data (e.g., vehicle data, user data and other data (FIG. 3)) from the plurality of vehicle systems 118 and/or the vehicle sensors 120.

The computing device 102 is also operatively connected for computer communication to a network 122 and one or more portable devices 124. It is understood that the connection from the I/O interface 112 to the network 122 and the portable devices 124 can be facilitated in various ways, for example, through a network connection (e.g., wired or wireless), a cellular data network from the portable device 124, an in-vehicle network (not shown), among others. Further, in some embodiments, the network 122 can be used to facilitate V2V and/or V2X communication between the computing device 102 and other vehicles.

The network 122 is, for example, a data network, the Internet, a wide area network or a local area network. The network 122 serves as a communication medium to various remote devices (e.g., databases, web servers, remote servers, application servers, intermediary servers, client machines, other portable devices (not shown)). It is understood, that in some embodiments, the portable devices 124 can be included in the network 122, accessed by the computing device 102 through the network 122, and/or the network 122 can access the portable devices 124 directly. Thus, in some embodiments, the computing device 102 can obtain data from the portable device 124 via the network 122. As will be discussed in an example herein, in some embodiments, the network 122 is a vehicle-to-vehicle (V2V) network, which can connect and communicate with other vehicles.

The one or more portable devices 124 are generally devices that provide input and/or output to the computing device 102, and in particular, the VR engine 116, to facilitate and provide a dynamic in-vehicle virtual reality environment to a user. In other embodiments, the one or more portable devices are sources for data and provide the data to computing device 102, and in particular, the VR engine 116, to facilitate and provide a dynamic in-vehicle virtual reality environment to a user. Thus, the portable devices 124, can obtain and/or provide data (e.g., vehicle data, user data, and other data (FIG. 3)) to the computing device 102, and in particular to the VR engine 116. It is understood that in some embodiments, the portable device 124 can include the components and functions of the computing device 102, including the VR engine 116. It is also understood that the portable devices 124 can also include speakers or headphones for audio input and output. For example, the portable device 124 can utilize wireless or wired technology for computer communication with the computing device 102. In another embodiment, the portable device 124 can connect to and utilize the audio input and output hardware and software (not shown) of the vehicle. Various input/output technologies can be implemented with the systems and methods described herein.

In some embodiments, the portable devices 124 can be a smart phone, a mobile device, a tablet, a data source, an HMI of a vehicle display, an output display, a navigation device, among others. In one embodiment, the portable device 124 can also be an output device (e.g., a vehicle display) used to render and view a virtual world. In another embodiment, the portable devices 124 can be virtual reality devices, for example, a virtual reality tracking device, a head-mounted display, virtual reality clothing, a virtual reality input device, virtual reality glasses, camera tracking systems in the vehicle for monitoring the user, the vehicle and/or the vehicle environment, among others. Further, the portable devices 124, in some embodiments, can be on-vehicle devices, for example, associated with the vehicle and/or a vehicle occupant of the vehicle. In another embodiment, the portable devices 124 are off-vehicle devices, associated with another vehicle and/or a vehicle occupant of another vehicle. In some embodiments, the portable devices 124 include on-vehicle and off-vehicle devices.

More specifically, the portable devices 124 as an off-vehicle device can be external or remote from the vehicle. Thus, the portable devices 124 can obtain data (e.g., vehicle data) externally from the vehicle. Accordingly, the vehicle data can include data about the external environment of the vehicle. For example, the portable device 124 can be an imaging unit (e.g., a camera, a video camera) attached to a stationary object along a road (e.g., a streetlight, a traffic light, a roadway sign). In another embodiment, the portable device 124 is operably connected for computer communication to external sensors and/or the portable device 124 can include sensors that sense vehicle data externally from the vehicle. For example, road sensors, rail sensors, sensors mounted to external areas of the vehicle or sensors mounted to another vehicle. These sensors are operable to sense a measurement of data associated with the vehicle externally from the vehicle and generate a data signal indicating said measurement of data. These data signals can be converted into other data formats (e.g., numerical) and/or used by the portable device 124 and/or the computing device 102 to generate other data metrics and parameters.

Figure 8:
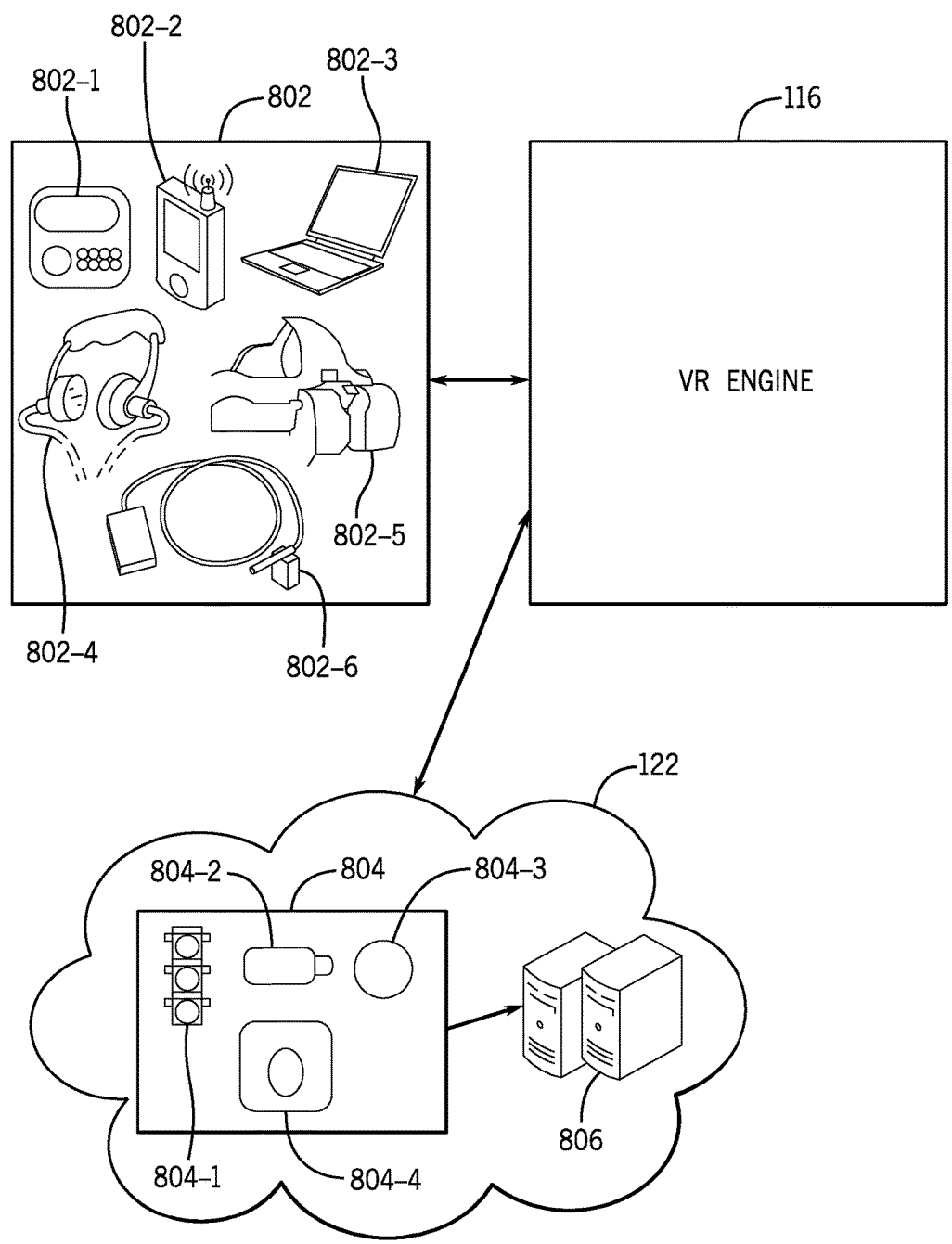
FIG. 8 is a schematic view of exemplary data sources that can obtain and transmit data to the VR Engine of FIG. 1 according to one aspect of the present disclosure.

The portable devices 124 and on-vehicle and off-vehicle devices will now be described in more detail with reference to FIG. 8. FIG. 8 is a schematic view of exemplary data sources (e.g., on-vehicle devices and off-vehicle devices) that can obtain and transmit data to the VR Engine 116 of FIG. 1 according to one embodiment. As mentioned above, portable devices 124 as on-vehicle devices provide input and/or output, including data (e.g., vehicle data, user data, and other data (FIG. 3)), with the VR engine 116. The one-vehicle devices are associated with the vehicle (e.g., implemented within the vehicle) and/or a vehicle occupant of the vehicle. In FIG. 8, the on-vehicle devices 802 can include a number of data collection sensors on-board the vehicle including, but not limited to, a vehicle computing device and/or vehicle display 802-1, a mobile device 802-2, a computer 802-3, headphones 802-4, a head mounted display (HMD) unit 802-5, and a virtual reality tracking device 802-6. The on-vehicle devices 802 are operably connected for computer communication with the VR Engine 116 to transmit and receive data collected by the on-vehicle devices 802. The connection can be facilitated, in some embodiments, by the I/O interface 112 and/or the network 122. As mentioned above, the on-vehicle devices can include wearable computing devices (e.g., headphones 802-4, a head mounted display (HMD) unit 802-5). It is understood that these devices can include integrated sensors, described above.

As mentioned above, portable devices 124 provide input and/or output, including data (e.g., vehicle data, user data, and other data (FIG. 3)), with the VR engine 116. In particular, off-vehicle devices obtain data externally from the vehicle. For example, the data can include data about the external environment of the vehicle. The data can be in different forms, for example, optical data (e.g., image, video), or quantitative data, among others. Examples of types of vehicle data that can be obtained by off-vehicle devices includes, but it's not limited to, data about the vehicle, other vehicles and/or objects (e.g., pedestrians) in the vehicle environment, for example, speed, acceleration, position, orientation, among others. Further, the data can include ambient environmental data, for example, temperature, humidity, light, weather conditions (e.g., rain, snow), among others.

In FIG. 8, the off-vehicle devices 804 can include, but are not limited to, 804-1 traffic light sensors, optical sensors 804-2 (e.g., mounted to a stationary object or road side object), in-road loop antennas and/or sensors 804-3, and external vehicle sensors and/or in-vehicle road sensors 804-4. In some embodiments, the data from the off-vehicle devices 804 are aggregated and stored at a data store 806. In other embodiments, the data from the off-vehicle devices 804 are transmitted directly to the VR engine 116. In one embodiment, the network 122 facilitates the communication of data between the off-vehicle devices 804, the data store 806, and the VR engine 116.

It is appreciated that the on-vehicle devices 802 and the off-vehicle devices 804 can comprise a network of sensors and the VR engine 116 can fuse data from the on-vehicle devices 802 and the off-vehicle devices 804, alone or in combination, to facilitate the systems and methods for in-vehicle dynamic virtual reality described herein.

A. Vehicle Implementation

The system of FIG. 1 will now be described as implemented within a vehicle 200 in FIG. 2. FIG. 2 is a schematic view of an exemplary vehicle and exemplary vehicle occupants implementing in-vehicle virtual reality systems and methods according to one or more aspects. In the examples that follow, it will be appreciated that the portable devices can be used in various combinations and located in other areas of the vehicle 200. In one example, the portable device 124 is a head mounted display (HMD), that can be placed on a user's body (e.g., head) or attached on a helmet or goggles. For example, referring to FIG. 2, a vehicle occupant 202, positioned in a seat 204 of the vehicle 200, is wearing an HMD 206 placed on the head of the vehicle occupant 202. The HMD 206 can provide information about the vehicle occupant 202, for example, tracking information, input information, and motion information, among others to the VR engine 116. The HMD 206 can also act as an output device to provide a virtual view generated by the VR engine 116 to the vehicle occupant 202. In the embodiment, of FIG. 2, the HMD 206 is an on-vehicle device, however, it is appreciated, that in other embodiments, the HMD 206 could be implemented in another vehicle (i.e., not the vehicle 200) as an off-vehicle device, and could provide data to the VR engine 116, via, for example, the network 122 (e.g., a V2V network). In another embodiment, the output device can include screen projection in the vehicle 200 implementing a CAVE Automatic Virtual Environment. For example, the vehicle 200 can include one or more areas (not shown) to display a virtual view generated by the VR engine 116 to the vehicle occupant 202.

In another embodiment, the vehicle occupant 202 is in possession of a tablet 208 (e.g., a portable device). The tablet 208 can provide information about the vehicle occupant 202, for example, tracking information, input information, and motion information, among others to the VR engine 116. For example, in one embodiment, the tablet 208 could include position and motion sensors. In other embodiments, the tablet 208 can also act as an output device to provide a virtual view generated by the VR engine 116 to the vehicle occupant 202. It is appreciated that the HMD 206 alone or in combination with the tablet 208 can provide information about the vehicle occupant 202 and provide a virtual view generated by the VR engine 116. It is also appreciated that the tablet 208 could be implemented in another vehicle (i.e., not the vehicle 200) as an off-vehicle device, and could provide data to the VR engine 116, via, for example, the network 122 (e.g., a V2V network).

In another embodiment, a vehicle occupant 210, for example, positioned in a back seat 212 of the vehicle 200, can be in possession of a portable device 214. In this embodiment, the portable device 214 can be a tablet, similar to the tablet 208. The portable device 214 can, in one embodiment, provide information about the vehicle occupant 210, for example, tracking information, input information, and motion information, among others to the VR engine 116. The portable device 214 can also act as an output device to provide a virtual view generated by the VR engine 116 to the vehicle occupant 210. It is also appreciated that the portable device 214 could be implemented in another vehicle (i.e., not the vehicle 200) as an off-vehicle device, and could provide data to the VR engine 116, via, for example, the network 122 (e.g., a V2V network).

In a further embodiment, the vehicle occupant 210 can also be associated with a portable device 216. The portable device 216 can, in one embodiment, provide information about the vehicle occupant 210, for example, tracking information, input information, and motion information, among others to the VR engine 116. Further, in some embodiments, the portable device 216 could obtain vehicle data from a source external from the vehicle 200. It is understood that the portable device 216 can be located, attached, and/or positioned in various areas of the vehicle 200. Moreover, it is appreciated that the portable device 214 alone or in combination with the portable device 216 can provide information about the vehicle occupant 210 and provide a virtual view generated by the VR engine 116. Further, it appreciated that the portable device 216 could be implemented in another vehicle (i.e., not the vehicle 200) as an off-vehicle device, and could provide data to the VR engine 116, via, for example, the network 122 (e.g., a V2V network).

Figure 9A:
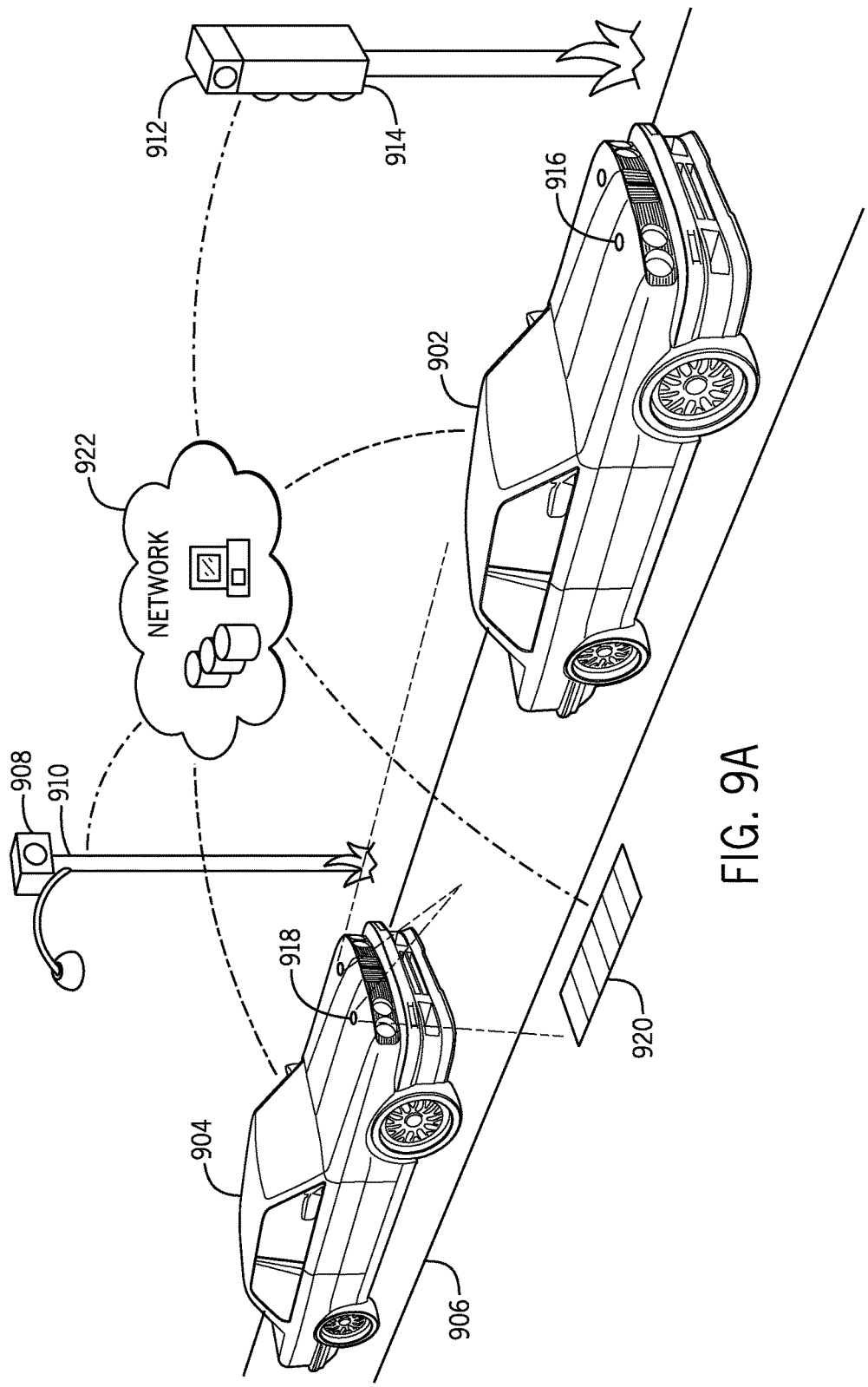
FIG. 9A is an illustrative example of an exemplary vehicle and portable devices obtaining vehicle data externally from the vehicle according to one aspect of the present disclosure.

In the embodiment described in FIG. 2, the portable devices are on-vehicle devices. However, it is appreciated that the portable devices can also be off-vehicle devices. Exemplary embodiments of off-vehicle devices implemented in a vehicle environment will now be described. FIG. 9A is an illustrative example of an exemplary vehicle and portable devices (e.g., off-vehicle devices) obtaining vehicle data externally from the vehicle according to one aspect. In particular, FIG. 9A includes a vehicle 902 (e.g., a host vehicle, the vehicle 200 of FIG. 2) and a second vehicle 904 driving along a road 906. In FIG. 9A, the off-vehicle devices can include, but are not limited to, an imaging unit 908 mounted to a street light 910, an imaging unit 912 mounted to a traffic light 914, external vehicle sensors 916 mounted to the vehicle 902, external vehicle sensors 918 mounted to a second vehicle 904, and in-road sensors 920.

It is appreciated that other types of sensors and other types of off-vehicle devices can be implemented in different configurations and locations.

The off-vehicle devices of FIG. 9A obtain vehicle data externally from the vehicle 902. The vehicle data can include data about the external environment of the vehicle 902. In one embodiment, the off-vehicle devices of FIG. 9A communicate data to a network 922 (e.g., the network 122 of FIG. 1). The network 922 can communicate said data to the vehicle computing device 102 and/or the VR engine 116 of FIG. 1.

Illustrative examples of types of data that can be obtained from the off-vehicle devices of FIG. 9A will now be discussed. For example, the imaging units 908 and 912 can obtain images and/or video of the vehicle 902 and/or the second vehicle 904 as said vehicles pass by the streetlight 910 and/or the traffic light 914. The images can be used to determine speed, acceleration, heading and/or bearing of the vehicle 902, the vehicle 904, and in relation to one another. The images can also be used to determine a location of the vehicle 902 and/or the second vehicle 904. The in-road sensors 920 can be used to measure or determine speed and/or acceleration of the vehicle 902, the vehicle 904, and/or the speed and/or acceleration of the vehicle 902 in relation to the vehicle 904. The in-road sensors 920 could also be used to measure a condition of the road 906, for example, a wet condition, an icy condition, among others. The data obtained from the off-vehicle devices of FIG. 9A can be used to determine vehicle motion data and augment and/or generate a virtual view based on the vehicle motion data.

Figure 9B:
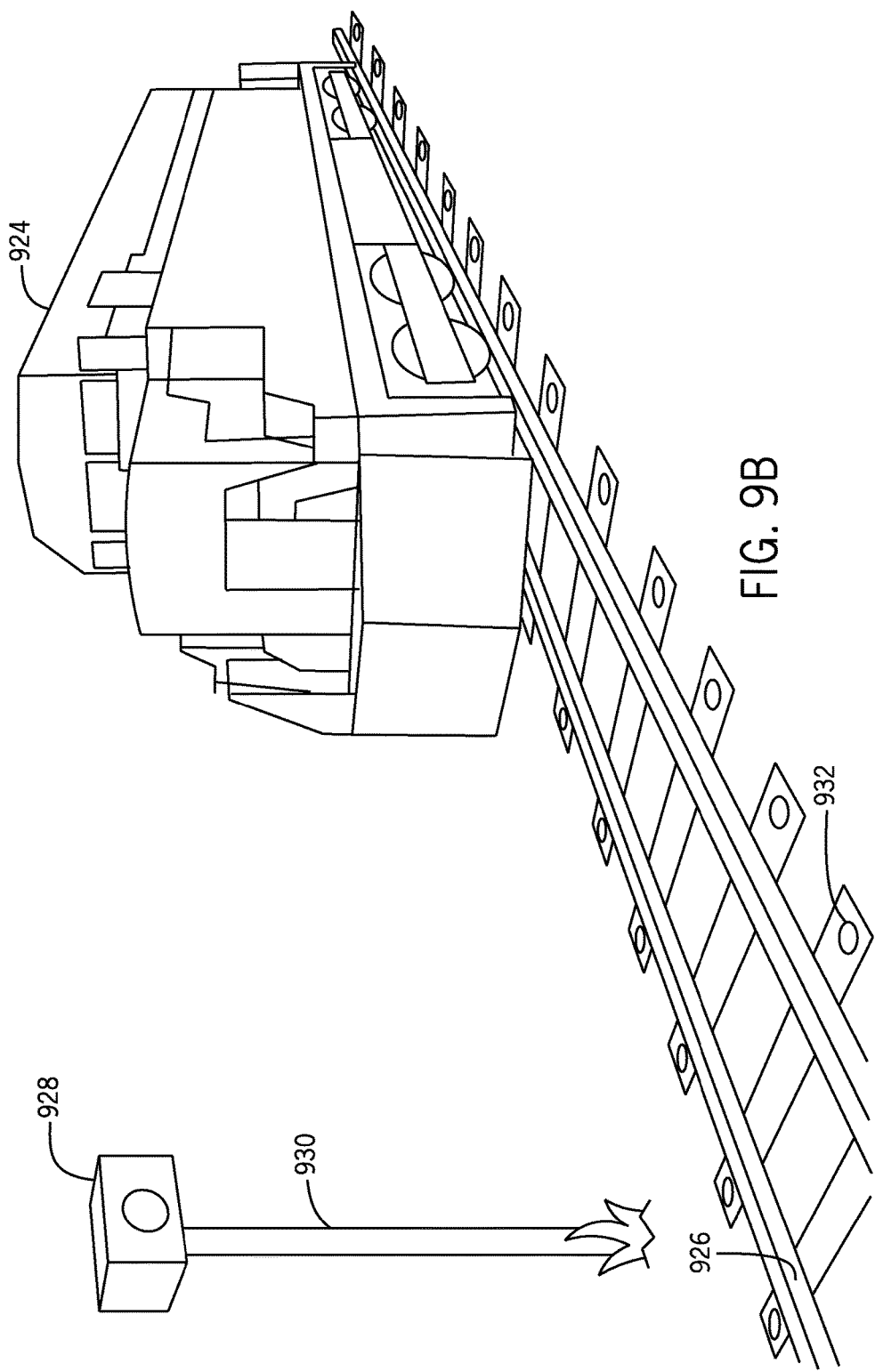
FIG. 9B is another illustrative example of an exemplary vehicle and portable devices obtaining vehicle data externally from the vehicle according to one aspect of the present disclosure.

FIG. 9B is another illustrative example of an exemplary vehicle and portable devices (e.g., off-vehicle devices) obtaining vehicle data externally from the vehicle according to one aspect of the present disclosure. In this embodiment, the vehicle 924 is a vehicle on a predetermined path, for example, a train, a roller coaster. It is appreciated, that in some embodiments, the vehicle 902 in FIG. 9A could also be a vehicle on a predetermined path, for example an autonomous vehicle. In FIG. 9B, the predetermined path can be, for example, tracks 926. In FIG. 9B, the off-vehicle devices can include, but are not limited to, an imaging unit 928 mounted to a stationary structure 930 and in-track sensors 932. It is appreciated that other types of sensors and other types of off-vehicle devices can be implemented in different configurations and locations. In some embodiments, a network (e.g., similar to the network 922) can be used to communicate data between the off-vehicle devices and the vehicle computing device 102 and/or the VR engine 116 of FIG. 1.

Illustrative examples of types of data that can be obtained from the off-vehicle devices of FIG. 9B will now be discussed. For example, the imaging unit 928 can obtain images and/or video of the vehicle 924 as said vehicle passes by the stationary structure 930. The images can be used to determine speed and/or acceleration of the vehicle 924. The images can also be used to determine a location of the vehicle 924. The in-track sensors 932 can be used to measure or determine speed and/or acceleration of the vehicle 924. The in-track sensors 932 could also be used to measure a condition of the tracks 926, for example, a wet condition, an icy condition, among others. Further, the in-track sensors and/or the imaging unit 928 can be used to obtain and/or determine a pre-determined path (e.g., the path of the tracks 926, the route of the vehicle 924) of the vehicle 924 or a current location of the vehicle 924 on the predetermined path. In other embodiments, the predetermined path can be obtained from an on-vehicle device, for example, a navigation unit, an electronic control unit, a processor (e.g., the processor 104). In the case of an autonomous vehicle, the predetermined path could be obtained from an on-vehicle device such a navigation unit and/or an external source accessed via the network 122 of FIG. 1. The data obtained from the off-vehicle devices of FIG. 9B can be used to determine vehicle motion data and augment and/or generate a virtual view based on the vehicle motion data.

B. Virtual Reality Engine

Figure 3:
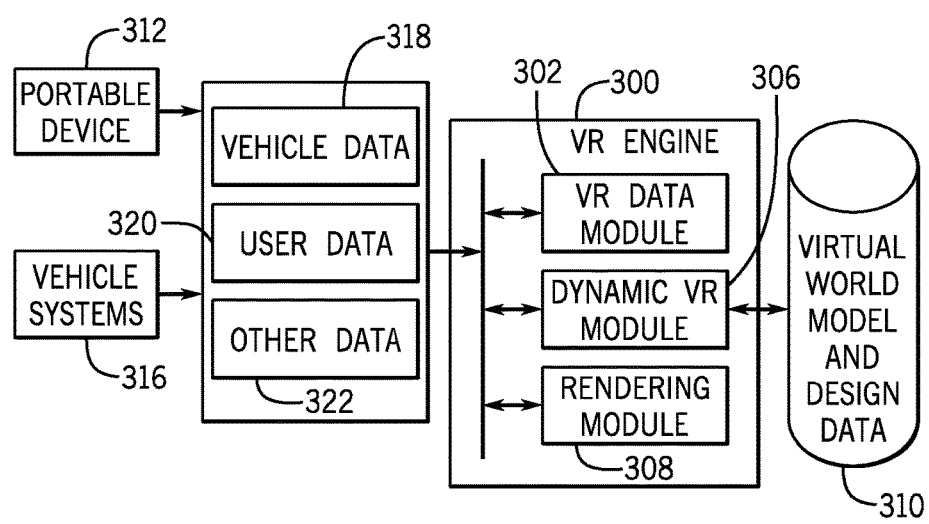
FIG. 3 is a block diagram of the exemplary virtual reality engine of FIG. 1 according to one aspect of the present disclosure.

The VR engine 116 of FIG. 1 and a system for in-vehicle dynamic virtual reality will now be discussed in detail with reference to FIGS. 1, 2 and 3. FIG. 3 illustrates a block diagram of a virtual reality (VR) engine 300 (e.g., the VR engine 116) according to an exemplary embodiment. For simplicity, not all components of FIG. 1 are shown in FIG. 3. The VR engine 300 includes a virtual reality data module 302, a dynamic virtual reality (VR) module 306, and a rendering module 308. In addition to the functionality described above with reference to FIG. 1, the aforementioned modules can access and/or receive vehicle data 318, user data 320 and other data 322, as well as communicate with a portable device 312 (e.g., the portable device 124) and vehicle systems 316 (e.g., the vehicle systems 118). As discussed above, the portable device 312 can provide input and/or output to the VR engine 300. Further, the portable device 312 can provide output to a user (e.g., a vehicle occupant 202, 210).

In one embodiment, the virtual reality data module 302 receives vehicle data from the one or more vehicle systems 316 (e.g., the vehicle systems 118) of a vehicle. For example, the vehicle data 318 can include vehicle data metrics and parameters derived from the vehicle systems 118 and/or the vehicle sensors 120. In another embodiment, the portable device 312 can include one or more on-vehicle devices and/or one or more off-vehicle devices. The off-vehicle devices, as described above with reference to FIGS. 8, 9A and 9B, obtain vehicle data externally from the vehicle. In particular, the vehicle data can include data about the external environment of the vehicle.

In a further embodiment, the virtual reality data module 302 receives vehicle data from a portable device 312. In this embodiment, the portable device 312 can obtain the vehicle data independently from the vehicle (i.e., without directly connecting and/or receiving data from the bus 114 (e.g., a vehicle CAN bus), the vehicle systems 118, and/or the vehicle sensors 120). For example, the portable device 312 can include position and motion sensors. The portable device 312 can gather vehicle data utilizing the position and motion sensors. In one embodiment, the portable device 312 is operably connected for computer communication to an output device.

The vehicle data includes vehicle dynamics data of the vehicle. The vehicle data 318 includes vehicle data metrics and parameters derived from the vehicle sensors 120. For example, vehicle data can include, but is not limited to, vehicle location data, vehicle orientation data, vehicle system state data, data related to one or more vehicle systems and/or components, vehicle environment data (e.g., interior and exterior environment data) among others. The vehicle data 318 can also include navigation data, for example, location data, direction data (e.g., origin, destination, point of interest), and a predetermined path of the vehicle, among others.

The vehicle data 318 can also include vehicle dynamics data that describes the dynamics of the vehicle and the motion of vehicle (e.g., velocity, direction, acceleration, yaw rate, steering rate, steering angles). Vehicle dynamics data can include, but is not limited to, real time data concerning the speed level, the acceleration rate, the yaw rate, the steering wheel position, the brake position, the throttle position, the transmission gear position of the vehicle, driver commands, dynamic car responses, tire and road forces, among others. Further, vehicle dynamics data can include derivatives of the data.

In some embodiments, the vehicle data 318 can be received from remote sources, for example, the network 122 and/or off-vehicle devices. In one embodiment, the VR data module 302 can receive predictive vehicle data or can determine predictive vehicle data based on the vehicle data 318 and/or the vehicle dynamics data. For example, vehicle predictive motion data can be based on pedal positions, vehicle system status/control, current vehicle location, vehicle destination information, among others. As an illustrative example, the position of the accelerator pedal of the vehicle and the time delay between pedal positions can be modeled with a dynamic model of the vehicle to determine vehicle predictive motion data. In another example, information from the accelerator pedal and traffic information (e.g., received from an off-vehicle device indicating a traffic light turning green) can be used to determine vehicle predictive motion data.

The virtual reality data module 306 also receives user data 320. For example, the user data 320 can be received from one or more of the portable devices 312. The user data 320 includes tracking data, interaction data, and user input data, among others. The user data can be based at least in part, on data from vision sensors (e.g., vehicle sensors 120, cameras, gesture/motion sensors), tracking systems, the portable device 312, the I/O device 312, and other sensors and systems that provide data about the user's interaction, position, orientation, location and motion. For example, the user data 320 can include position, orientation, and location information about the user. In another embodiment, the user data 320 can include position, orientation, and location information about the user in relation to the vehicle, for example, based in least in part, on the vehicle data 318 (including the vehicle dynamics data). Thus, in one embodiment, the user data 320 can provide information on the user's motion and position and how the user's motion and position is affected by the vehicle dynamics. The user data can also include health data about the user, for example, from health monitoring devices (e.g., portable medical devices worn by the user, wearable computing devices, in-vehicle biological health monitoring devices). In some embodiments, the user data can also be received from other networks 122 and/or the vehicle systems 316.

In another embodiment, the virtual reality data module 302 also receives other data for facilitating dynamic in-vehicle virtual reality. The other data 322 can include can include big data from the vehicle systems 316, the portable device 312, and/or other networks 122. For example, other data 322 can include environmental data associated with the vehicle (e.g., interior, exterior), road conditions (e.g., bumpy roads, slick roads, traffic conditions), weather conditions, vehicle temperature, among others. In another embodiment, the other data 322 can include driver action data, for example, driving history, fuel efficiency, interactions with other vehicle systems, gestures, motion relative to the vehicle, among others. Further, in some embodiments, the other data 322 can include social media data from, for example, the other networks 122.

The dynamic VR data module 306 generates a virtual view based on the vehicle data, the user data and a virtual world model. In one embodiment, a data store stores a virtual world model, the virtual world model including one or more components that define the virtual view. For example, in FIG. 3, a data store 310 can store a virtual world model and design data. The virtual world model and design data can include game themes, software or program instructions to define and generate a virtual world and/or a virtual view. In another embodiment, the memory 106 and/or the disk 108 can store some or all of the aforementioned virtual world model and design data. In another embodiment, the virtual world model and design data is received from remote sources, for example, the network 122.

Figure 4:
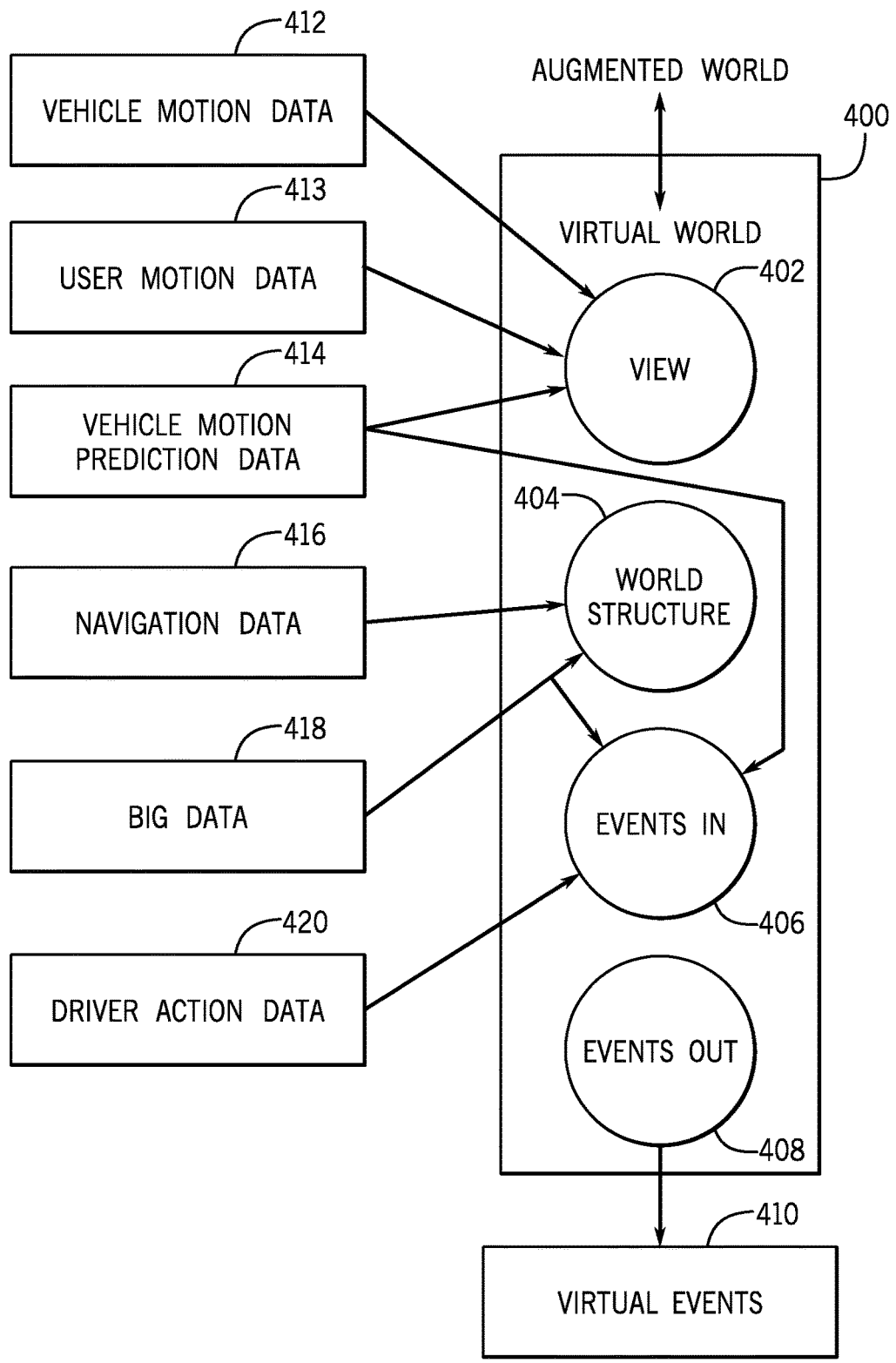
FIG. 4 is an exemplary virtual world model diagram including data flow according to one aspect of the present disclosure.
Figure 5:
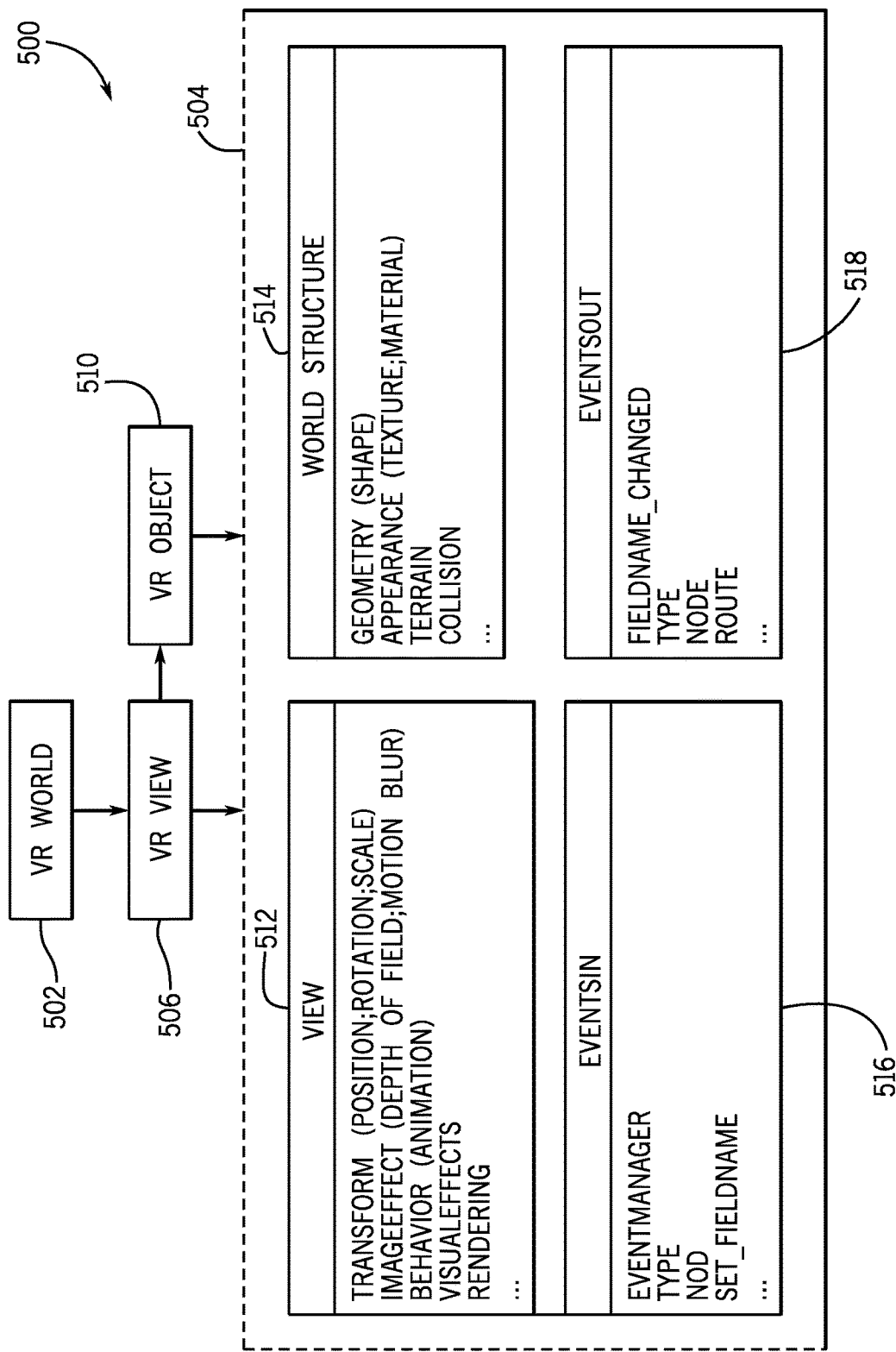
FIG. 5 is an exemplary schematic class diagram of a virtual reality world including the virtual world model of FIG. 4 according to one aspect of the present disclosure.

An exemplary virtual world model will now be described with reference to FIGS. 4 and 5. FIG. 4 illustrates an exemplary virtual world data model 400 diagram including data flow according to an exemplary embodiment. FIG. 5 is a schematic class diagram 500 of a virtual reality world 502 including a group of node classes 504 of the virtual world model of FIG. 4 according to an exemplary embodiment. The node classes, objects, properties, references, methods and events (i.e., the one or more components that define the virtual view) discussed with FIGS. 4 and 5 are exemplary in nature and are not intended to be limiting. Generally, a virtual world model is a collection of many individual operations and objects that define the virtual world and one or more virtual views. The virtual world model can be defined in various modeling and programming languages, for example, virtual reality modeling language (VRML), DirectX, OpenGL, Unity, among others. As illustrated in FIG. 5, the virtual world 502 can include one or more virtual views 506. The virtual world 502 and the virtual view 506 can also include one or more virtual objects 510. The virtual view 506 and the virtual object 510 are defined by node classes, and in the example of FIG. 5, the group of node classes 504. In some embodiments, nodes can be grouped and applied to one or more virtual views 506 and/or virtual objects 510 in a hierarchy structure. For example, the group of node classes 504 can apply to parent and child nodes of the virtual views 506 and/or virtual objects 510 associated with a particular group of nodes (i.e., the group of node classes 504).

In the illustrated embodiment of FIG. 5, the group of node classes 504 includes a view node class 512, a world structure node class 514, an eventsIn node class 516 and an eventsOut node class 518. Each node class can include components that define and/or modify the node classes, for example, other nodes, properties, fields, methods and/or references. In some embodiments, the nodes, properties, fields, methods and/or references can be predefined based on the virtual world, for example, for a particular theme, game, among others. Additionally, in some embodiments, the nodes, properties, fields, methods and/or references can be predefined based on the user, for example, based on user preferences. Other node classes, properties, fields, methods and/or references not included in FIGS. 4 and 5 can be implemented and may be based on the different modeling and programming languages mentioned above.

The group of node classes 504 of FIG. 5 will now be discussed in detail. The view node class 512 defines the position and/or the orientation of the virtual view 506, the virtual object 510 and/or operations associated with the virtual view 506 and/or the virtual object 510. For example, in FIG. 5, the transform node can be used to perform geometric transformations and includes the properties position, rotation and scale. The imageEffect node handles image post processing effects. Exemplary image post processing effects include depth of field, motion and blur, among others. The behavior node can be used to enable and disable different behaviors, for example, animation and motion. The visualEffects node can be used to define visual effects, for example, line renderers, halo effects, trail renders, among others. The rendering node can be used to define settings and components for rendering in-game and user interface elements.

The world structure class node 514 defines the structure and appearance of the virtual view 506, the virtual object 510 and/or operations associated with the virtual view 506 and/or the virtual object 510. For example, the geometry node can be used to define shapes. The appearance node can be used to define texture and material. The terrain node can be used to define aspects of a terrain and landscape. The collision node defines which objects in a virtual view are collidable.

The eventsIn class node 516 defines the types and names of events that each node can receive or generate. For example, the EventManager node can define custom events and includes event handlers and listeners that determine event triggers (e.g., determined from user data (e.g., user input), vehicle data) to initialize specific events. The type field defines a type of the event, the node field defines which node(s) the event applies to and the set_fieldname method can be used to modify a value of a field during the event. The eventsOut class node 518 manages execution and routing of the event. The fieldname_changed field indicates what field(s) are changed during the event, the type field defines the type of the event, the node field can define which node the event applies to and the route method defines how the event is sent to a node and how the event is received and generated by a node. Again, the class nodes and components in FIG. 5 are exemplary in nature and other class nodes and components can be implemented with the systems and methods discussed herein. The class nodes and components can be augmented according to at least one of the vehicle data and the user data to generate a dynamic virtual world and/or virtual views to a user. Specifically, the vehicle data and the user data can be used to initialize nodes, set properties and fields and initialize or define events.

Referring again to FIG. 4, the model 400 includes one or more components that define a virtual view. For example, in FIG. 4, the model includes a view class node 402, a world structure class node 404, an eventsIn class node 406 and an eventsOut class node 408. The class nodes in FIG. 4 can include similar methods, properties, fields and references as the class nodes described with FIG. 5. FIG. 4 also illustrates exemplary data flow to the class nodes, for example, for augmenting the class nodes. Specifically, the dynamic VR module 306 can use these types of data to augment specific class nodes. As discussed in FIG. 3, the data can include vehicle data 318, user data 320 and/or other data 322. The types of data illustrated in FIG. 4 are types of vehicle data 318, user data 320 and/or other data 322 in FIG. 3. Specifically, in FIG. 4, the data includes, but is not limited to, vehicle motion data (including vehicle dynamics data) 412, user motion data 413, vehicle motion predictive data 414, navigation data 416, big data 418 and driver action data 420.

Referring again to FIG. 3, the dynamic VR module 306 modifies and/or augments one or more components of the virtual world model 400 based on at least one of the vehicle data and the user data. As shown in FIG. 4, the arrows illustrate the flow from the different types of data to the VR model components. Accordingly, the arrows illustrate exemplary flow of data that can be used to augment specific VR model components. For example, vehicle motion data 412 (e.g., vehicle dynamics data, vehicle velocity, direction, acceleration, jerk, vehicle occupant motion data) can be used to augment components of the view class node 402. User motion data 413 (e.g., position, orientation, location, input) can be used to augmented components of the view class node 402. Further vehicle motion predictive data 414 (e.g., pedal positions, auto cruise control) can also be used to augment the view class node 402. In another embodiment, the navigation data 416 (e.g., navigation location, directions) can be used to augment the world structure class node 404. The big data 418 (e.g., speed bumps, road conditions, steering conditions) can also be used to augment the world structure class node 404. Further, the big data 418 can be used to augment the eventsIn class node 406. The driver action data 420 (e.g., fuel efficiency, driver input, audio) can also be used to augment the eventsIn class node 406.

As discussed above, the view class node 402, the world structure class node 404, the eventsIn class node 406 and the eventsOut class node 408 define the virtual view and can be augmented using at least one of vehicle data and user data to provide a dynamic virtual view to a user. In particular, the data types in FIG. 4, can be used to augment the components of the virtual world model 400 thereby generating a virtual view that can include one or more virtual events 410. In one embodiment, the dynamic VR model 306 augments one or more properties of the one or more components of the virtual world model based on the vehicle data and the user data. For example, the one or more properties of the one or more components can include those properties of the class nodes illustrated in FIG. 5. In one embodiment, one or more of the properties can include a motion property defining a motion of the component. For example, the view class node 402 can include a property, for example, transform class node that defines the position, the rotation and or the scale of an object. Based on at least one of the vehicle data and the user data, the transform class node can be augmented to change the position, rotation and or scale of the object. As an illustrative example, and referring to FIGS. 4 and 5, a VR object 510 can be defined as a ball (i.e., defined by the world structure class node 514, for example, the geometry class node). The vehicle motion data 412 (e.g., vehicle dynamics data) can be used to augment a feature of the ball. For example, using the view class node 402 and the transform class node, the position, rotation and/or the scale of the ball can be set based on the vehicle motion data 412. Accordingly, the VR object 510, (i.e., the ball) is synchronized with the vehicle motion data 412.

Referring again to FIG. 3, the rendering module 308 renders the virtual view from the dynamic VR module 306 to an output device by controlling the output device to update display of the virtual view according to the vehicle dynamics data. For example, the dynamic reality module 306 renders the virtual view to an output device, which can be a portable device 312, for example a vehicle display, a HMD, among others. In one embodiment, the rendering module 308 determines vehicle motion data 412 based on the vehicle dynamics data (i.e., the vehicle data 318). The rendering module 308 can also determine user motion data 413 representing motion of the user relative to the vehicle based on the user data 320 and the vehicle data 318. For example, in one embodiment, the portable device 312 can include accelerometer sensors and/or gyroscope sensors that help determine a position, a location and/or an orientation of the user in relation to the vehicle. The vehicle motion data 412 and/or the user motion data 413 can be used to augment one or more components of the virtual world model 400, thereby controlling the output device to update display of the virtual view according to the vehicle dynamics data. In another embodiment, the rendering module 308 can augment the rendering speed (e.g., the frames per second, frame rate, frame update rate defined and implemented by the graphics rendering hardware/software) of the output device directly based on the vehicle motion data 412 and/or the user motion data 413.

In a further embodiment, the rendering module 308 determines a temporal-motion rendering speed based on the vehicle motion data and the user motion data. The temporal-motion rendering speed is a correlation between the vehicle motion data and the user motion data. In another embodiment, the temporal-motion rendering speed also considers a time component from the vehicle data. The temporal-motion rendering speed is a post image processing and rendering property (e.g., frames per second, frame rate, frame update rate) that minimizes the difference between the vehicle motion data and the user motion data. The rendering module 308 can render the virtual view to the output device by controlling the output device to update display of the virtual view based on the temporal-motion rendering speed. For example, the rendering speed (e.g., the frames per second, frame rate, frame update rate) implemented by the graphics hardware and/or software of the I/O device 316 can be augmented based on the temporal-motion rendering speed. In another embodiment, the dynamic VR module 306 augments one or more properties of the one or more component of the virtual world model based on the temporal-motion rendering speed. For example, the view class node 402 can include a rendering properties and/or properties related to motion (See FIG. 5). In one embodiment, these properties can include frames per second, frame rate and/or a frame update rate.

By updating the virtual view according to the vehicle dynamics data in real-time, the virtual view presented to the user is dynamic and considers the vehicle motion and the user motion, thereby simulating the vehicle motion and the user motion in the virtual view in real-time. Said differently, one or more components of the virtual world model are synchronized based on at least the vehicle data and the user data, including the vehicle dynamics data and the user motion data. Not only does this provide a truly immersive virtual reality environment for the user, but also virtual reality motion sickness can be minimized, because the virtual view considers vehicle dynamics and user motion.

II. Exemplary Methods for Dynamic in-Vehicle Virtual Reality

Figure 6:
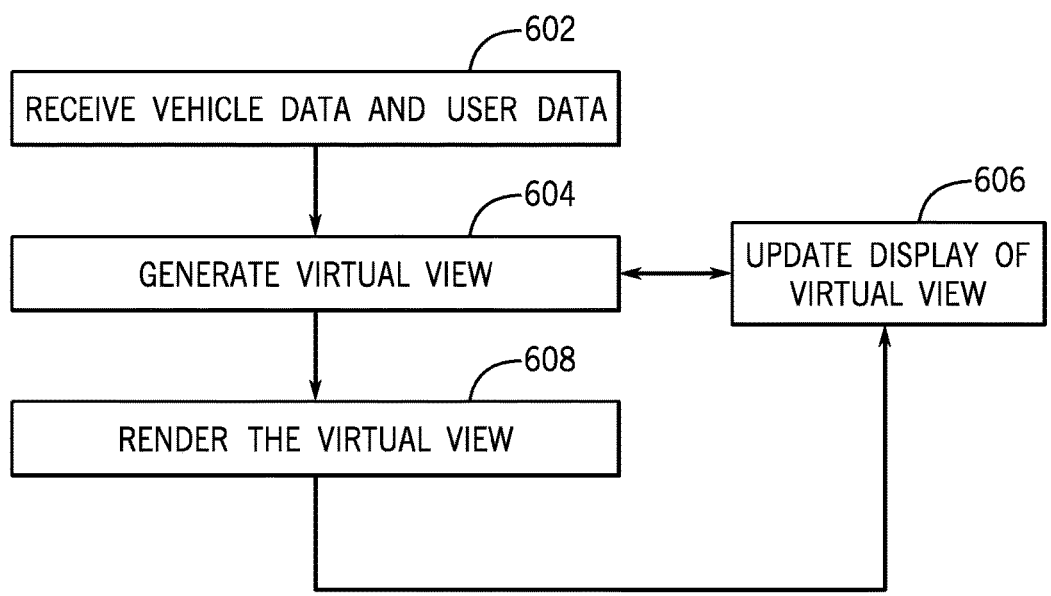
FIG. 6 is a flow chart diagram of an exemplary method for dynamic in-vehicle virtual reality according to one aspect of the present disclosure.

The dynamic in-vehicle virtual reality system illustrated in FIGS. 1-5, 8, 9A and 9B described above will now be described in operation with reference to a method of FIG. 6. It will be appreciated that the systems and components discussed above with references to FIGS. 1-5 can similarly be implemented with the method of FIG. 6. The method of FIG. 6 includes at block 602, receiving vehicle data and user data from one or more portable devices, wherein the vehicle data comprises vehicle dynamics data of the vehicle. For example, referring to FIG. 3, the VR data module 302 can receive vehicle data 318. The vehicle data 318 can include vehicle dynamics data. In one embodiment, the vehicle data 318 is received from one or more portable devices 312 (e.g., on-vehicle devices and/or off-vehicle devices). In another embodiment, the vehicle data 318 is received from one or more vehicle systems 316. The VR data module 302 can also receive user data 320 from one or more portable devices 312 (e.g., on-vehicle devices and/or off-vehicle devices). In another embodiment, the use data 320 is received from vehicle systems 316.

In one embodiment, the portable device is an off-vehicle device that obtains the vehicle data externally from the vehicle, for example, the off-vehicle devices 804 of FIG. 8. As an illustrative example, the off-vehicle device is an imaging unit mounted to a stationary structure external to the vehicle. The vehicle data can include data about the external environment of the vehicle.

Referring back to FIG. 6, at block 604, the method includes generating a virtual view based on the vehicle data, the user data and a virtual world model. The virtual world model includes one or more components that define the virtual view. FIG. 4 illustrates an exemplary virtual world model 400 diagram including data flow according to an exemplary embodiment. The virtual world model 400 includes one or more components that define the virtual view. For example, the view node class 402, the world structure node class 404, the events in node class 406 and the events out node class 408 are exemplary components that define the virtual view. In particular, these node classes define one or more virtual views and one or more virtual objects of the virtual world. The node classes can contain other nodes, properties, fields, methods and references (See FIG. 5).

In one embodiment, generating the virtual view includes augmenting one or more components of the virtual world model according to at least one of the vehicle data and the user data. For example, the view node class 402, the world structure node class 404, the events in node class 406 and the events out node class 408, and/or, nodes, properties, fields, methods and references associated with these nodes, can be augmented based on at least one of the vehicle data and the user data. In FIG. 4, the vehicle motion data 412, the user motion data 413, the vehicle motion prediction data 414, the navigation data 416, the big data 418 and the driver action data 420 are exemplary types of data that can be used to augment one or more of the components of the virtual world model 400.

In one embodiment, the method includes determining an orientation and a location of the vehicle based on the vehicle data. For example, navigation data 416 (e.g., from for example the GPS 110) can be used to determine the orientation and the location of the vehicle. The dynamic VR module 306 and/or the rendering module 308 can determine the orientation and the location of the vehicle based on the vehicle data 318. The method can also include determining an orientation and a location of the user relative to the vehicle based on the user data and the vehicle data. For example, the dynamic VR module 306 and/or the rendering module 308 can determine the orientation and the location of the user relative to the vehicle based on the user data 320 and the vehicle data 318. For example, the VR devices (e.g., tracking devices, the HMD 202, the portable device 208) can include sensors (e.g., accelerometers, gyroscopes, compasses) that provide user data for determining the orientation and the location of the user relative to the vehicle.

Augmenting one or more components of the virtual world model can be based on at least one of the orientation and the location of the vehicle and the orientation and the location of the user. As a non-limiting example, the dynamic VR module can augment the world structure class node 404, with the orientation and the location of the vehicle and the orientation and the location of the user in relation to the vehicle to provide real-time world structures. For example, the terrain class node (See FIG. 5) can be augmented to provide a terrain or landscape in the virtual view that includes a component based on the orientation and the location of the vehicle and the orientation and the location of the user in relation to the vehicle.

In another embodiment, one or more virtual events 410 can be augmented or created based on at least one of the vehicle data 318 and the user data 320. As an illustrative example, driver action data 420 can be used to augment the eventsIn class node 406. Driver action data 420, can include for example, driving history, fuel efficiency, interactions with other vehicle systems, gestures, motion relative to the vehicle, among others. As a non-limiting illustrative example, a user 312 (i.e., a vehicle occupant 202), may roll down a vehicle window (not shown). This driver action is determined based on vehicle data 318 from the vehicle systems 316 (e.g., power window vehicle system) and user data 320 from the VR devices 316 (e.g., tracking devices) indicating that the user 312 has rolled down the vehicle window. In response, the dynamic VR module 306 can augment, for example, the eventIn class node 406, to trigger an event in the virtual view associated with the user 312 rolling down the vehicle window. For example, a simulation of the wind from the vehicle window can be presented in the virtual view, among others. As another illustrative example, the dynamic VR module 306 can define the structure of the simulation of the wind based on a temperature determined from the vehicle data 318. For example, if the temperature is a certain degree, the simulation of the wind in the virtual view may include particles of snow. This can be defined by augmenting the eventsIn class node 406 of the world structure class node 404. The eventsOut node 408 can then route the event to create the virtual event 410.

In a further embodiment, the method includes determining vehicle motion data based on the vehicle dynamics data. The dynamic VR module 306 and/or the rendering module 308 can determine the vehicle motion data based on the vehicle data 318, which includes vehicle dynamics data. As discussed above, vehicle motion data 412 defines real-time motion of the vehicle. Further, the vehicle motion data can also include predictive vehicle motion data determined based on the vehicle data 318, the user data 320 and/or the other data 322. For example, the predictive vehicle motion data can be based on pedal positions, cruise control, destination information, among others.

In another embodiment, the vehicle motion data is based on vehicle data obtained from the off-vehicle devices. In a further embodiment, the vehicle motion data is based on a predetermined path of the vehicle. The predetermined path of the vehicle can be obtained from one or more portable devices 312, for example, road sensors (e.g., off-vehicle device), a navigation unit (e.g., an on-vehicle device), among others. In one embodiment, determining the vehicle motion data includes determining at least a velocity and an acceleration of the vehicle based on the predetermined path of the vehicle.

As an illustrative example, a vehicle with a predetermined path can be a roller coaster. In this example, information about the predetermined path and/or an initial set of conditions (e.g., physical dimensions of the track, hill height, number of loops, run time, angle of decent, track material type, mass, speed, force) can be obtained from the roller-coaster (e.g., an ECU) and/or sensors associated with the roller coaster, for example, sensors along the track of the roller coaster. Based on the initial set of conditions, velocity and acceleration can be calculated, for example, using Newton's second law, circular motion equations, among others.

As another illustrative example, a vehicle with a predetermined path can be a self-driving car (e.g., an autonomous vehicle), the path of which has already been determined and stored, for example, at the vehicle (e.g., the ECU, navigation device). The controls of the self-driving vehicle (e.g., steering angle, acceleration position) can serve as inputs to determine vehicle emotion data, for example, velocity and/or an acceleration of the vehicle.

In a further embodiment, the method can also include determining user motion data representing motion of the user relative to the vehicle based on the user data and the vehicle data. The user motion data can be based on the vehicle data and the user data 320 and can be determined by the dynamic VR module 306 and/or the rendering module 308.

Referring again to FIG. 6, at block 608 the method includes rendering the virtual view to an output device by controlling the output device to update the display of the virtual view according to the vehicle dynamics data. For example, the dynamic reality module 306 renders the virtual view to one or more of the VR devices 316 (i.e., the HMD 206, the portable device 208). In one embodiment, the rendering module 308 renders the virtual view to an output device by controlling the output device to update the display of the virtual view according to the vehicle motion data 412 and the user motion data 413. This can be accomplished, in one embodiment, by directly augmenting the rendering speed (e.g., the frames per second, frame rate, frame update rate) implemented by the graphics hardware and/or software of the portable devices 312. In another embodiment, shown at block 606, the dynamic VR module 306 augments one or more components of the virtual world model 400 according to the vehicle motion data 412 and the user motion data 413.

In another embodiment, the method includes determining a temporal-motion rendering speed based on the vehicle motion data and the user motion data. Rendering the virtual view can include controlling the output device to update display of the virtual view based on the temporal-motion rendering speed. The temporal-motion rendering speed is a correlation between the vehicle motion data 412 and the user motion data 413. In another embodiment, the temporal-motion rendering speed also considers a time component from the vehicle data. The temporal-motion rendering speed is a post image processing and rendering property (e.g., frames per second) that minimizes the difference between the vehicle motion data 412 and the user motion data 413. The rendering module 308 can render the virtual view to the output device by controlling the output device to update display of the virtual view based on the temporal-motion rendering speed. For example, the rendering speed (e.g., the frames per second, frame rate, frame update rate) implemented by the graphics hardware and/or software of the portable devices 312 can be augmented based on the temporal-motion rendering speed.

In a further embodiment, shown at block 606, the dynamic VR module 306 augments one or more properties of the one or more component of the virtual world model based on the temporal-motion rendering speed. For example, the view class node 402 can include a rendering properties and/or properties related to motion (See FIG. 5). In one embodiment, these properties can include frames per second, frame rate and/or a frame update rate. In this way, the virtual view presented to the user is dynamic and simulates the vehicle motion in real-time. Said differently, one or more components of the virtual world model are synchronized based on at least the vehicle data and the user data, including the vehicle dynamics data and the user motion data. Not only does this provide a truly immersive virtual reality environment for the user, but also virtual reality motion sickness can be minimized, because the virtual view considers the vehicle dynamics and the user motion. Further, each virtual view presented to the user can be updated and maintained based on the vehicle dynamics data. For example, if a virtual view presents user settings (i.e., not in a game play mode), the virtual view is always updated and maintained based on the vehicle dynamics data.

In some embodiments, virtual reality objects and/or operations can have predefined rendering speeds. As an illustrative example, certain objects or certain virtual worlds may be set to rendering speeds of 25 ms. This predefined rendering speed can be adjusted based on the vehicle dynamics data as discussed above. Thus, in some embodiments, the temporal-motion rendering speed can be based on a predefined rendering speed, vehicle motion and user motion. Further, the temporal-motion rendering speed can also consider other types of data based on the user. For example, as discussed above, other data 322 can include health data associated with the user 312. If for example, the health data indicates motion or sensory issues (e.g., disorientation, vertigo, motion sickness), the temporal-motion rendering speed can be adjusted based on the health data to minimize the motion or sensor issues.

Figure 7A:
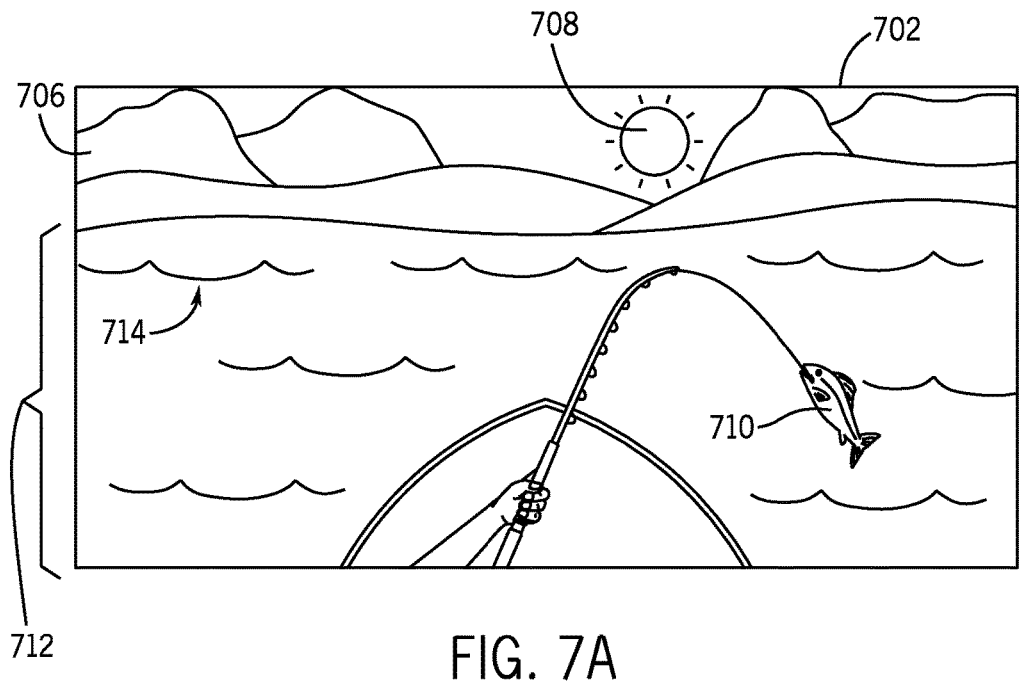
FIG. 7A is an illustrative example of an exemplary virtual view according to one aspect of the present disclosure.
Figure 7B:
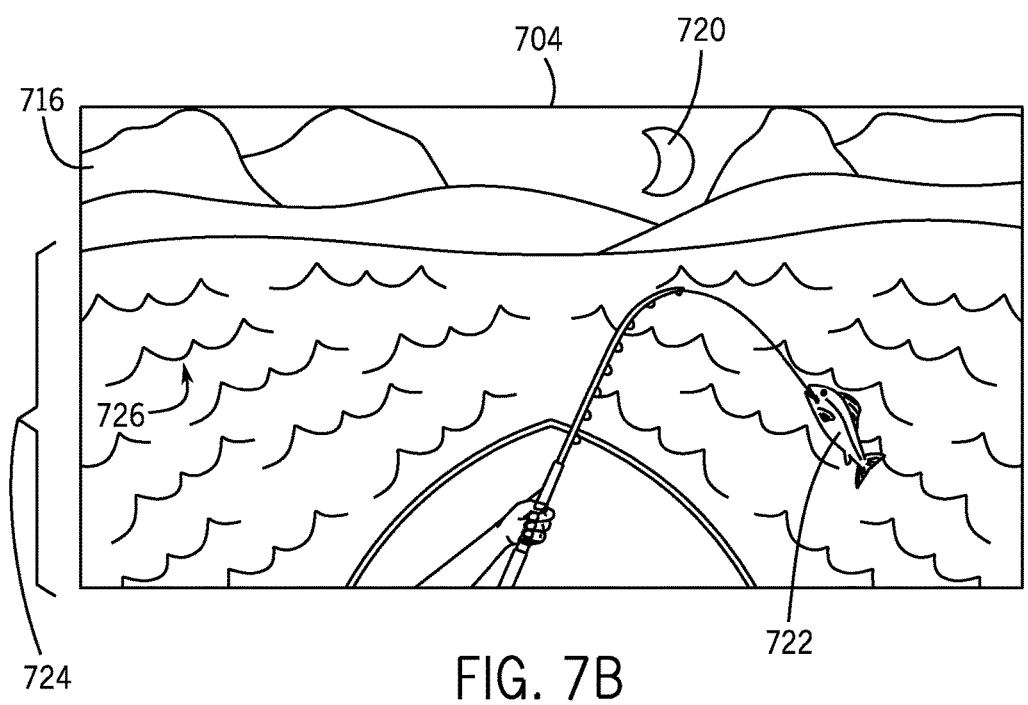
FIG. 7B is an illustrative example of another exemplary virtual view according to one aspect of the present disclosure.

III. Illustrative Examples of Methods for Dynamic in-Vehicle Virtual Reality Illustrative examples of dynamic virtual views generated by the methods and systems discussed herein will now be described with reference to FIGS. 7A and 7B. FIG. 7A illustrates a virtual view 702 and FIG. 7B illustrates a virtual view 704 from a fishing virtual reality game, the objects and operations of which are defined by a virtual world model, for example the virtual world model 400 of FIG. 4 and the schematic class diagram 500 of a virtual reality world of FIG. 5. Specifically, the virtual views 702, 704 are generated based on the vehicle data, the user data and the virtual world model, the virtual world model including one or more components that define the virtual views 702, 704. The virtual views 702, 704 can be displayed in one embodiment, on the output device 124 (FIG. 1). In another embodiment, the virtual views 702, 704 can be displayed on the portable device 124 (FIG. 1).

The virtual view 702 includes one or more virtual reality objects, including a landscape 706, a sun 708, a fish 710 and a water object 712. The water object 712 includes one or more waves 714. Again, the objects and operations of the virtual view 702 are defined by a virtual world model. One or more components of the virtual world model can be augmented based according to at least one of the vehicle data and the user data. In particular, in one embodiment, the virtual world model can be augmented based on vehicle dynamics data and/or the virtual view 702 can be rendered to an output device by controlling the output device to update display of the virtual view according to the vehicle dynamics data. In this way, the virtual view and objects of the virtual view are influenced by the vehicle data and/or the user data and the virtual view and objects of the virtual view are synchronized with the vehicle dynamics data. For example, the dynamic VR module 306 can augment the world structure class node 404 (e.g., the terrain class node) to dynamically generate and update the virtual view 702 with objects based on a location and an orientation of the vehicle 200 and a location and an orientation of the vehicle occupant 202. As an illustrative example, the vehicle 200 is driving in a mountainous region during the day. Accordingly based on the location and the orientation of the vehicle 200 and a time component determine from the vehicle data 318, the appearance and the terrain of the landscape object 706 in the virtual view 702 includes mountains and the sun 708. This is accomplished by augmenting the world structure class node 404 with the location and the orientation of the vehicle 200 and a time component determine from the vehicle data 318.

As another example, the fish object 710 can be generated as a type of fish indigenous to the location and the orientation of the vehicle 200 and the location and the orientation of the vehicle occupant 202. Further, the position of the fish object 710 can also be generated based on the location, the orientation of the vehicle 200, the location, and the orientation of the vehicle occupant 202. For example, the view class node 402 defining the position and the orientation of the fish object 710 can be augmented to present a point of view to the vehicle occupant 202 based on the location and the orientation of the vehicle 200 and the location and the orientation of the vehicle occupant 202.

As a further example, the water object 712 in the virtual view 702 can be generated based on the vehicle dynamics data. As an illustrative example, the vehicle data 318 can indicate a steady speed and yaw rate indicating a straight direction. Further, the user data 320 can indicate stead user motion. Accordingly, in FIG. 7A, the waves 714 appear calm and steady based on the vehicle data 318 and the user data 320. However, if the vehicle 200 suddenly increases in speed, as shown in FIG. 7B, the water object 724 including one or more waves 720 appear rough. In other embodiments, the water object 724 including the one or more waves 720 can be generated by altering the parallax motion or depth of motion of the view class node 402 based on the vehicle dynamics data.

In another embodiment, the yaw rate of the vehicle 200 and motion of the vehicle occupant 202 can be used to augment the view class node 402 of the boat object to generate a virtual view with the boat turning or moving based on the yaw rate of the vehicle 200 and the motion of the user 202. As is apparent, many variations of the virtual view can be generated based on the vehicle data 318, the user data 320 and the other data 322. In addition, in a situation where the virtual view is not in a game play mode (i.e., the virtual view presents game settings, user settings, start-up instructions), the virtual view is still generated and updated according to the vehicle dynamics data. Accordingly, by updating the virtual view according to the vehicle dynamics data in real-time, the virtual view presented to the user is dynamic and considers the vehicle motion and the user motion, thereby simulating the vehicle motion and the user motion in the virtual view in real-time. Not only does this provide a truly immersive virtual reality environment for the user, but also virtual reality motion sickness can be minimized, because the virtual view considers the vehicle dynamics and the user motion.

IV. Exemplary Methods for Dynamic in-Vehicle Virtual Reality Affecting Real World Driving In the embodiments discussed above, the systems and methods for dynamic in-vehicle virtual reality includes affecting a virtual reality environment (e.g., viewed by a user) based on real world data and real driving data (e.g., data about the user, the vehicle, vehicle environment and the user in relation to the vehicle and the vehicle environment). In some embodiments, the systems and methods for dynamic in-vehicle virtual reality can be bi-directional, in which data from the virtual reality environment affects the vehicle and vehicle control (e.g., the vehicle's motion and movement). In this embodiment, the user and the virtual reality environment have an impact on real world driving by controlling one or more vehicle systems of the vehicle. The systems and methods will be described herein with reference to an autonomous vehicle, however, it is understood that the systems and methods can be implemented with a vehicle manually operated by a driver.

A method and system for dynamic in-vehicle virtual reality affecting real world driving will now be described with reference to FIG. 10 in association with FIGS. 1-9B. It is understood, that like named elements can include similar components and perform similar functions as described above with FIGS. 1-9B. The methods discussed herein can operate in the environment 100 of FIG. 1.

Figure 10:
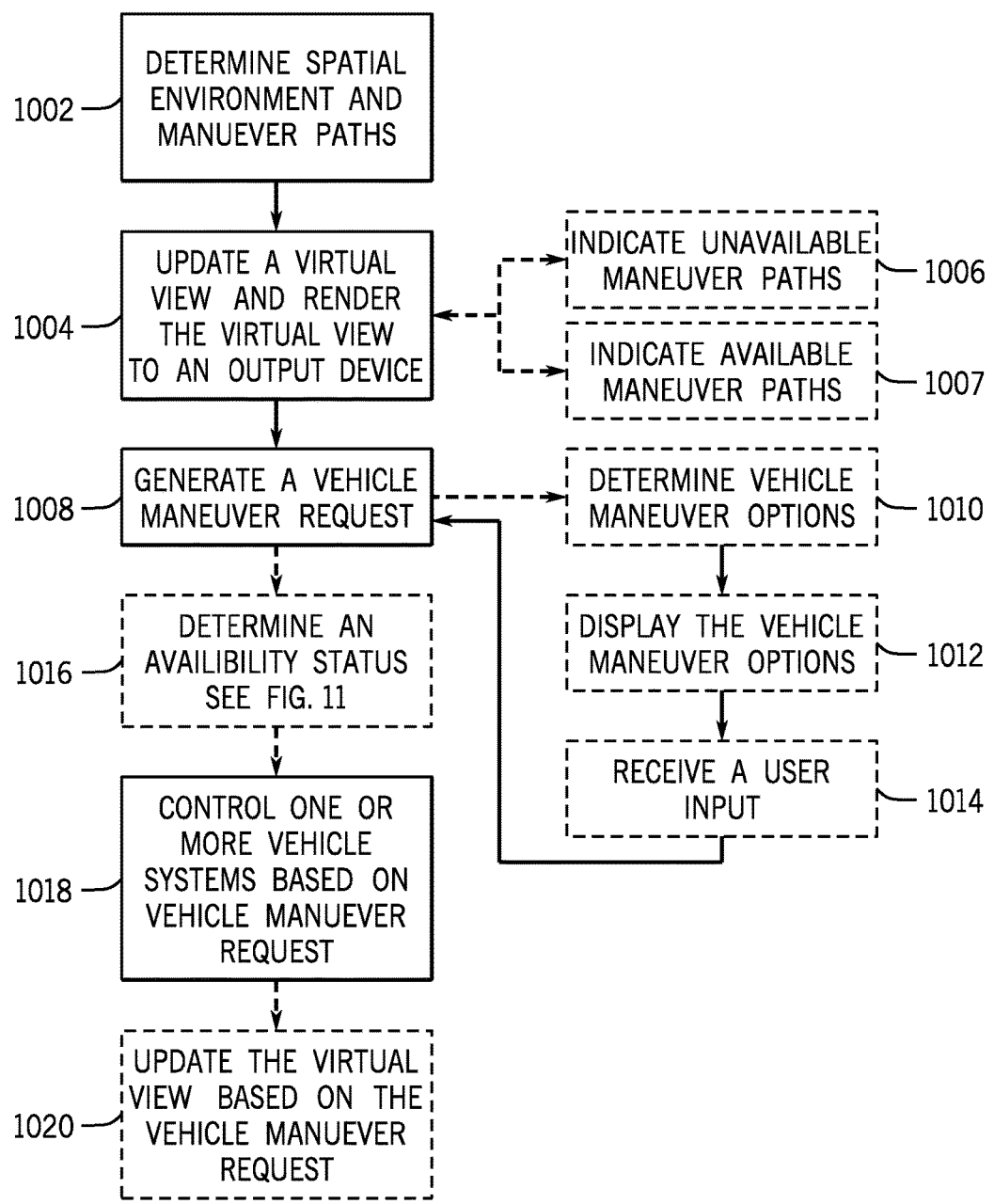
FIG. 10 is a flow chart diagram of an exemplary method for dynamic in-vehicle virtual reality affecting real world driving according to one aspect of the present disclosure.

Referring now to FIG. 10, a flow chart diagram of an exemplary method for dynamic in-vehicle virtual reality affecting real world driving according to one aspect of the present disclosure is illustrated. At block 1002, the method includes determining a spatial environment around a vehicle and one or more maneuver paths for the vehicle in the spatial environment. The spatial environment defines a real world space around the vehicle (e.g., a total envelope of space). The spatial environment can include obstacle/pedestrian information, traffic flow information, navigation information, route information, among other conditions that define the spatial environment. The maneuver paths for the vehicle define real world vehicle paths (e.g., a motion path, a way, or course taken) in traveling from one point to another point, and can be within the spatial environment. The maneuver paths can include direction and speed of the vehicle.

Further, the maneuver paths are at least one of an available maneuver path or an unavailable maneuver path. An available maneuver path indicates a maneuver path that is possible (e.g., obstacle and/or collision free route, in accordance with a current navigation route) for the vehicle considering the spatial environment and the conditions of the spatial environment. An unavailable maneuver path indicates a maneuver path that is not possible (e.g., would result in a collision, is off-course with the current navigation route) for the vehicle considering the spatial environment and the conditions of the spatial environment. Accordingly, the spatial environment including the maneuver paths provides the vehicle with information about the surrounding environment, possible motion path space, and available maneuver space.

The spatial environment and maneuver paths can be determined by the virtual reality data module 302 based on vehicle data 318 received from one or more vehicle systems 118. The spatial environment and maneuver paths of the vehicle can also be based on data from one or more off-vehicle devices 804 that obtain vehicle data externally from the vehicle. In other embodiments, the spatial environment and maneuver paths of the vehicle can also be based on data from other vehicles, for example in a vehicle-to-vehicle network. As an illustrative example, and referring to FIGS. 3 and 9A, the virtual reality data module 302 can determine the spatial environment and maneuver paths of the vehicle 902 based on data from a second vehicle 904 (e.g., via a V2V network facilitated by the network 922), an imaging unit 912, a traffic light 914, external vehicle sensors 916, 918, in-road sensors 920, or other data from the network 922. Similarly, in FIG. 9B, the virtual reality data module 302 can determine the spatial environment and maneuver paths of the vehicle with a predetermined path 924 based on an imaging unit 928, in-track sensors 932, and the predetermined path 924 received, for example, from a position determination unit 110.

An illustrative example of a spatial environment and maneuver paths will now be described with reference to FIG. 12B. FIG. 12B is a schematic diagram 1210 of a street intersection including a vehicle 1212 affected by in-vehicle virtual reality according to one aspect of the present disclosure. In this example, the vehicle 1212 is similar to the vehicle 200 (FIG. 2), which includes one or more users and an output device 124 displaying a virtual view. The virtual view can be, for example, a virtual view 1200 shown in FIG. 12A, which will be described in more detailed herein. In FIG. 12B, a spatial environment 1224 is shown around the vehicle 1212. The spatial environment 1224 can be various sizes to encompass the total envelope space for the vehicle 1212. The spatial environment 1224 is identified based on the vehicle data 318 and/or the other data 322 (e.g., sensor information, navigation information, traffic information).

Further, the one or more maneuvers are identified based on the spatial environment 1224 and the vehicle data 318 and/or the other data 322. As an illustrative example, in FIG. 12B, one or more maneuver paths are indicated by arrows 1226, 1228 and 1230. The spatial environment and maneuver paths can be based on a temporal parameter and/or a future position. The temporal parameter and/or the future position can be determined based on data from, for example, the position determination device 110. Further, in some embodiments, the temporal parameter and/or the future position can be a function of data from the position determination device 110 and a component of the virtual view (e.g., the virtual world model 310). In other embodiments, which will be described in further detail herein, a vehicle maneuver request can include a temporal parameter. Thus, the virtual reality data module 302 can determine spatial environment and maneuver paths based on the temporal parameter.

Referring again to FIG. 10, the method includes at block 1004, updating a virtual view based on the spatial environment and the maneuver paths. Updating the virtual view can include augmenting one or more components of a virtual world model to indicate the spatial environment and the maneuver paths. The dynamic virtual reality module 306 can update the virtual view including augmenting one or more components of a virtual world model 310. In one embodiment, updating the virtual view based on the spatial environment and the maneuver paths includes augmenting one or more components of the virtual world model to indicate unavailable maneuver paths at block 1006. Thus, the dynamic virtual reality module 306 can determine which maneuver paths are unavailable and update the virtual view (e.g., by augmenting components of the virtual world model) to provide an indication of the unavailable maneuver paths in the virtual view.

As an illustrative example, and referring to FIG. 12B, the maneuver paths for the vehicle 1212 include maneuver paths 1226, 1228 and 1230. The dynamic virtual reality module 306 can determine if a maneuver path is available or unavailable based on vehicle data 318 and other data 322. In other embodiments, the virtual reality data module 302 can determine if a maneuver path is available or unavailable when determining the spatial environment and the maneuver paths at block 1002. In FIG. 12B, maneuver path 1226 (e.g., "Turn Left") is unavailable because of the oncoming car 1216. Accordingly, the dynamic virtual reality module 306 can augment one or more components of the virtual world model 310 to indicate the maneuver path 1226 as unavailable in the virtual view 1200 of FIG. 12A.

Figure 12A:
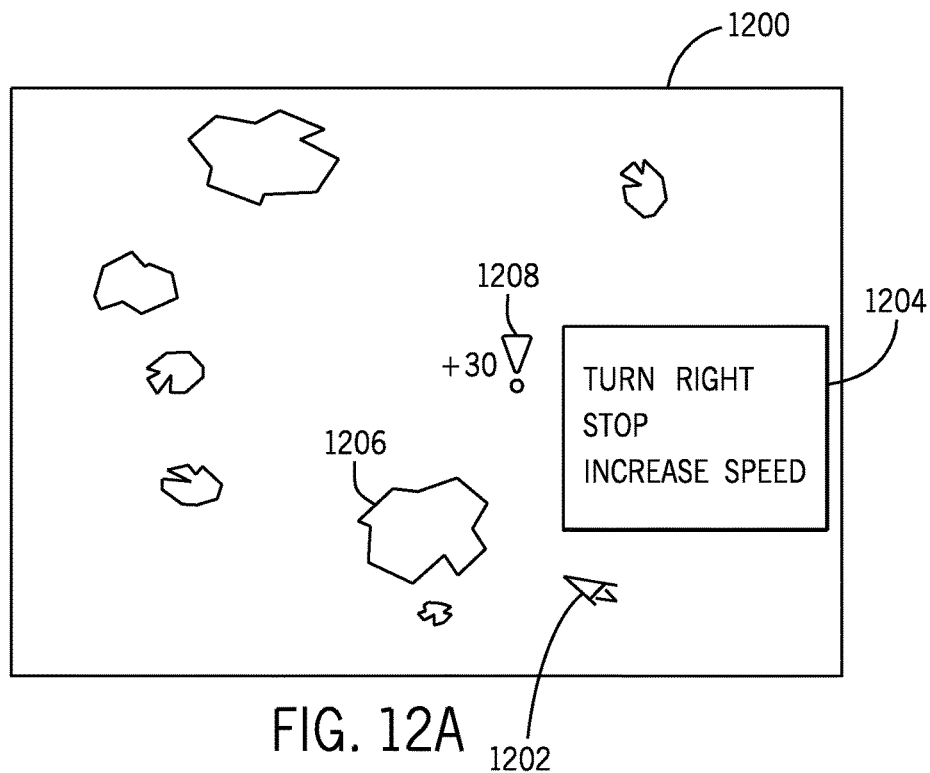
FIG. 12A is an illustrative example of an exemplary virtual view with a graphic menu including vehicle maneuver paths according to one aspect of the present disclosure.
Figure 12B:
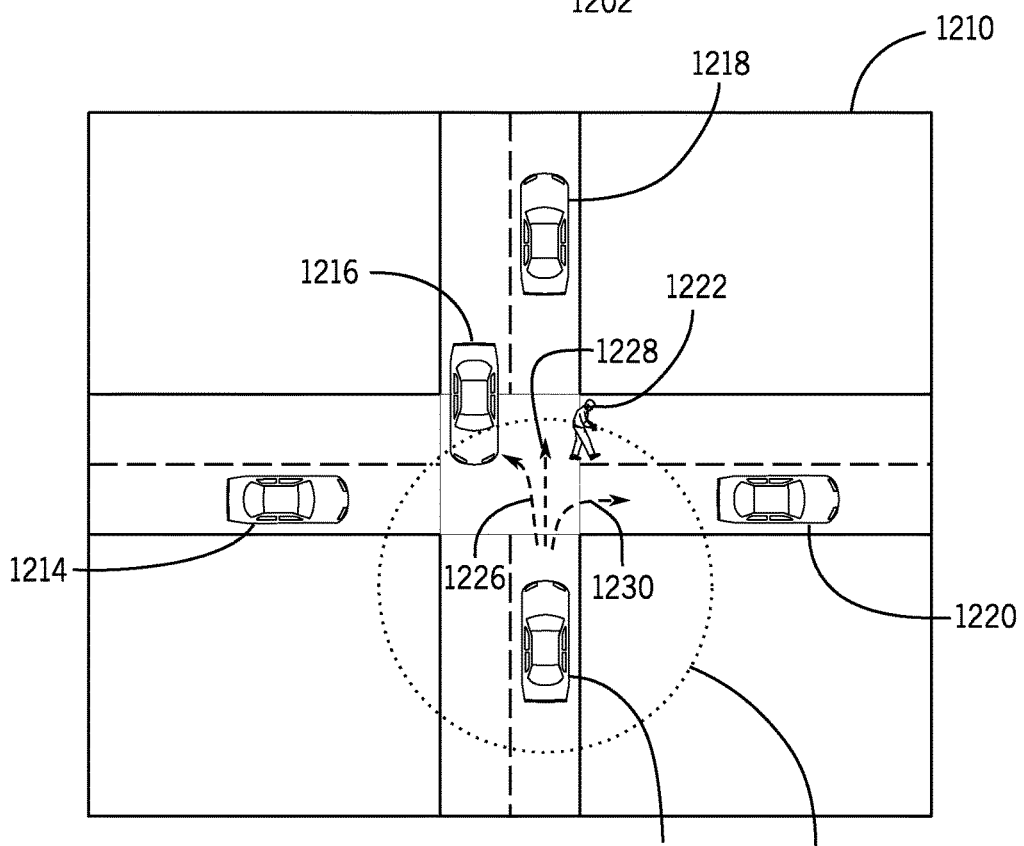
FIG. 12B is a schematic diagram of a street intersection including a vehicle affected by in-vehicle virtual reality as shown in the exemplary virtual view of FIG. 12A according to one aspect of the present disclosure.

FIG. 12A illustrates an exemplary virtual view 1200 as displayed on an output device 124. In this embodiment, the virtual view 1200 illustrates a space virtual reality game, the objects and operations of which are defined by a virtual world model, for example, the virtual world model 400 of FIG. 4 and the schematic class diagram 500 of a virtual reality world of FIG. 5. As discussed above in detail, the virtual view 1200 is generated based on the vehicle data 318, the user data 320 and the virtual world model 310, the virtual world model 310 including one or more components that define the virtual view 1100. In this illustrative example, the space virtual reality game includes a ship 1202 to shoot and destroy asteroids and saucers, while not colliding with the asteroid or being hit by the saucers' counter-fire.

Referring again to the illustrative example of block 1006 of FIG. 10, in FIG. 12A, an asteroid 1206 is placed in the path of the ship 1202 therefore providing an indication that a maneuver path of a left turn is unavailable. Other components or graphic illustrations can be used to restrict or dissuade an action in the virtual view corresponding to an unavailable maneuver path. The virtual view, as augmented, is rendered to an output device. For example, to an output device 124 by the rendering module 308.

In one embodiment, updating the virtual view based on the spatial environment and the maneuver paths includes augmenting one or more components of the virtual world model to indicate available maneuver paths at block 1007. Thus, the dynamic virtual reality module 306 can determine which maneuver paths are available and update the virtual view (e.g., by augmenting components of the virtual world model) to provide an indication of the unavailable maneuver paths in the virtual view.

Referring again to FIG. 12B, the maneuver paths for the vehicle 1212 include maneuver paths 1226, 1228 and 1230. The dynamic virtual reality module 306 can determine if a maneuver path is available or unavailable based on vehicle data 318 and other data 322. In other embodiments, the virtual reality data module 302 can determine if a maneuver path is available or unavailable when determining the spatial environment and the maneuver paths at block 1002. In FIG. 12B, maneuver paths 1228 (e.g., "Straight") and 1230 (e.g., "Turn Right") 1228 are available. Accordingly, the dynamic virtual reality module 306 can augment one or more components of the virtual world model 310 to indicate the maneuver path 1228 and 1230 as available in the virtual view 1200 of FIG. 12A. For example, in FIG. 12A, a bonus indicator 1208 is provided in a path of the ship 1202 corresponding to the available maneuver path 1230. Thus, if the ship 1202 reaches the bonus indicator 1208, 30 bonus points are awarded. Other components or graphic illustrations can be used to allow or persuade an action in the virtual view corresponding to an available maneuver path. The virtual view, as augmented, is rendered to an output device. For example, to an output device 124 by the rendering module 308.

Referring again to FIG. 10, at block 1008 the method includes generating a vehicle maneuver request for a vehicle. For example, the dynamic virtual reality module 304 generates a vehicle maneuver request for a vehicle. The vehicle maneuver request includes at least one desired controlled and/or direction of the vehicle, for example the vehicle 200 of FIG. 2. The vehicle maneuver request can include at least a desired vehicle maneuver. Further, the vehicle maneuver request can include a temporal element, for example a time at which the vehicle maneuver is to be executed. The vehicle maneuver request could also include a location at which the vehicle maneuver is to be executed. Table 1, shown below, is an exemplary vehicle maneuver request object including exemplary parameters. The exemplary parameters include other parameters, which will be discussed in further detail herein. These parameters can be generated, transmitted and/or received by the output device 124, the VR engine 116 and/or the one or more vehicle systems 118. It is appreciated that the parameters described below are exemplary in nature and other parameters/values can be implemented. Further, some of the parameters can be stored in a virtual world model as shown in FIG. 5.

TABLE 1

| Parameters | Description | Exemplary Value |
| --- | --- | --- |
| vehicle maneuver (e.g., desired vehicle maneuver) | One or more vehicle commands to control the vehicle in movement and/or direction. Specifically, one or more vehicle commands to control one or more parameters of one or more vehicle systems of the vehicle. | Brake at 0.2 g for 300 ms, yaw clockwise at 0.008 rad/sec for 700 ms, followed by counter clockwise yaw of same magnitude and duration |
| time | A time or time interval in which to execute the vehicle maneuver. | See above, 300 ms and 700 ms. |
| location | A location of the vehicle where the vehicle maneuver is to be executed and/or a future location of the vehicle. | 41.499570, −81.693685 |
| spatial environment | A spatial environment around the vehicle and available maneuvers in the spatial environment for the vehicle. | Dimensions defining the spatial environment; Valid available maneuvers in the spatial environment. |
| availability status | A status indicating whether the vehicle maneuver request is valid in the available maneuvering space. | valid or invalid |

TABLE 1-continued

| Parameters | Description | Exemplary Value |
| --- | --- | --- |
| inter-vehicle request | One or more vehicle commands to control other vehicles in the available maneuvering space thereby allowing the vehicle maneuver request. | Shift lanes to the right at a speed of 10 mph. |
| authorization status | A status from the other vehicles in response to the inter-vehicle request. | approved or denied |

The desired vehicle maneuver can be selected by a user (e.g., a vehicle occupant 202, 210) who is experiencing a virtual reality world/view through a output device 124 (e.g., portable device). In other embodiments, the desired vehicle maneuver can be automatically determined by the VR engine 116 based on a current virtual view displayed on the output device 124 and/or a virtual world model 310. In one embodiment, generating the vehicle maneuver request can include generating the vehicle maneuver request based on a user input to the output device 124.

For example, at block 1010, the method can include determining one or more vehicle maneuver options (e.g., maneuver paths). In one embodiment, the virtual reality data module 302 determines one or more vehicle maneuver options. In some embodiments, the virtual reality data module 302 determines the vehicle maneuver options as available maneuver paths at blocks 1002 and/or 1007. The one or more vehicle maneuver options can be determined by the virtual reality data module 302 based on vehicle data 318, user data 320, other data 322 and/or a virtual world model 310. In particular, the vehicle maneuver options are associated with the current virtual view displayed to a user (e.g., a vehicle occupant 202, 210) who is experiencing a virtual reality world/view through the output device 124. In another embodiment, generating the vehicle maneuver request can include generating the vehicle maneuver request based on a virtual world model 310 of a virtual view currently displayed on the output device 124.

At block 1012, the one or more vehicle maneuver options can be displayed to the user, for example, on a display of the output device. For example, the rendering module 308 can render the one or more vehicle maneuvers as determined by the virtual reality data module 302 to the output device 124. At block 1014, the method can include receiving a user input including a desired vehicle maneuver, wherein the desired vehicle maneuver can be selected from the one or more vehicle maneuver options.

As an illustrative example, the virtual view 1200 shown in FIG. 12A illustrates a graphic menu including vehicle maneuver options according to one embodiment. As shown in FIG. 12A, a graphic pop-up user menu 1204 is displayed on the virtual view 1200. The menu 1204 illustrates three vehicle maneuver options (e.g., maneuver paths, available maneuver paths, unavailable maneuver paths), namely, "Turn Right," "Stop," and "Increase Speed." The menu 1204 can include any number of vehicle maneuver options as determined by the virtual reality data module 302. In this example, the vehicle maneuver options correspond to a desired movement of the ship 1202, which will subsequently affect the movement of the vehicle 200.

Figure 13A:
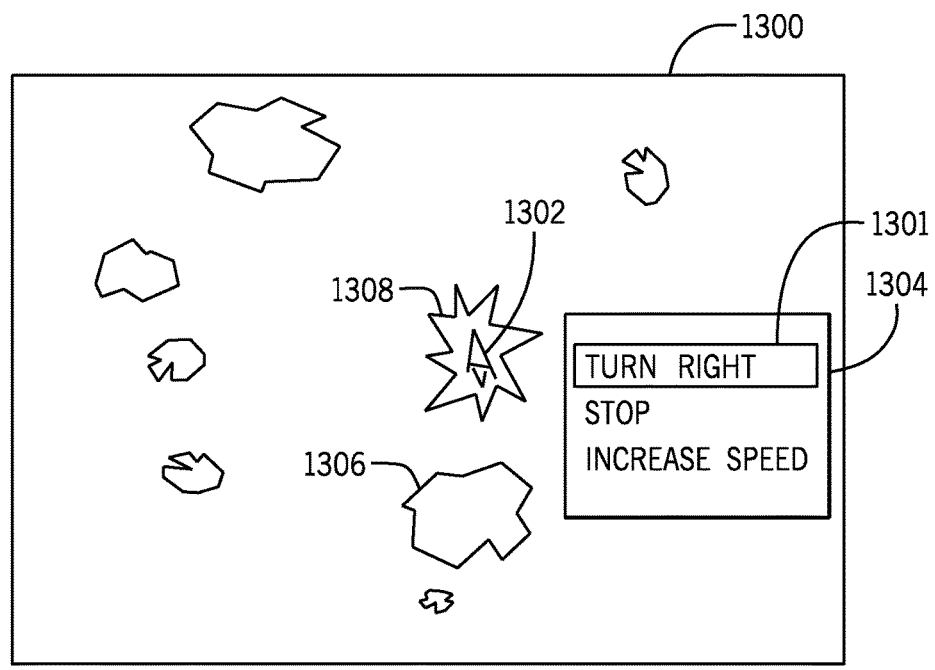
FIG. 13A is an illustrative example of the exemplary virtual view of FIG. 12A after a vehicle maneuver request is applied according to one aspect of the present disclosure.

A user operating the output device 124, can select one or more vehicle maneuver options from the menu 1204. As shown in FIG. 13A, the user has selected the vehicle maneuver "Turn Right," indicated by element 1301. In another embodiment, the user could select a vehicle maneuver option by interacting directly with the virtual view 1200. For example, the user could use a touch gesture or a non-touch gesture to select a vehicle maneuver. The user input can be received by the virtual reality data module 302 via the output device 124, and the virtual reality data module 302 can generate a vehicle maneuver request based on receiving the user input from the output device 124 at block 1008.

Referring again to FIG. 10, at block 1016, the method can include determining an availability status of the vehicle maneuver request based on the spatial environment and the maneuver paths. In one embodiment, determining the availability status of the vehicle maneuver request includes determining if the vehicle maneuver request is valid (e.g., available) with respect to the spatial environment and available maneuver paths. In one embodiment, the virtual reality data module 302 determines the availability status of the vehicle based on the spatial environment and maneuver paths.

Figure 11:
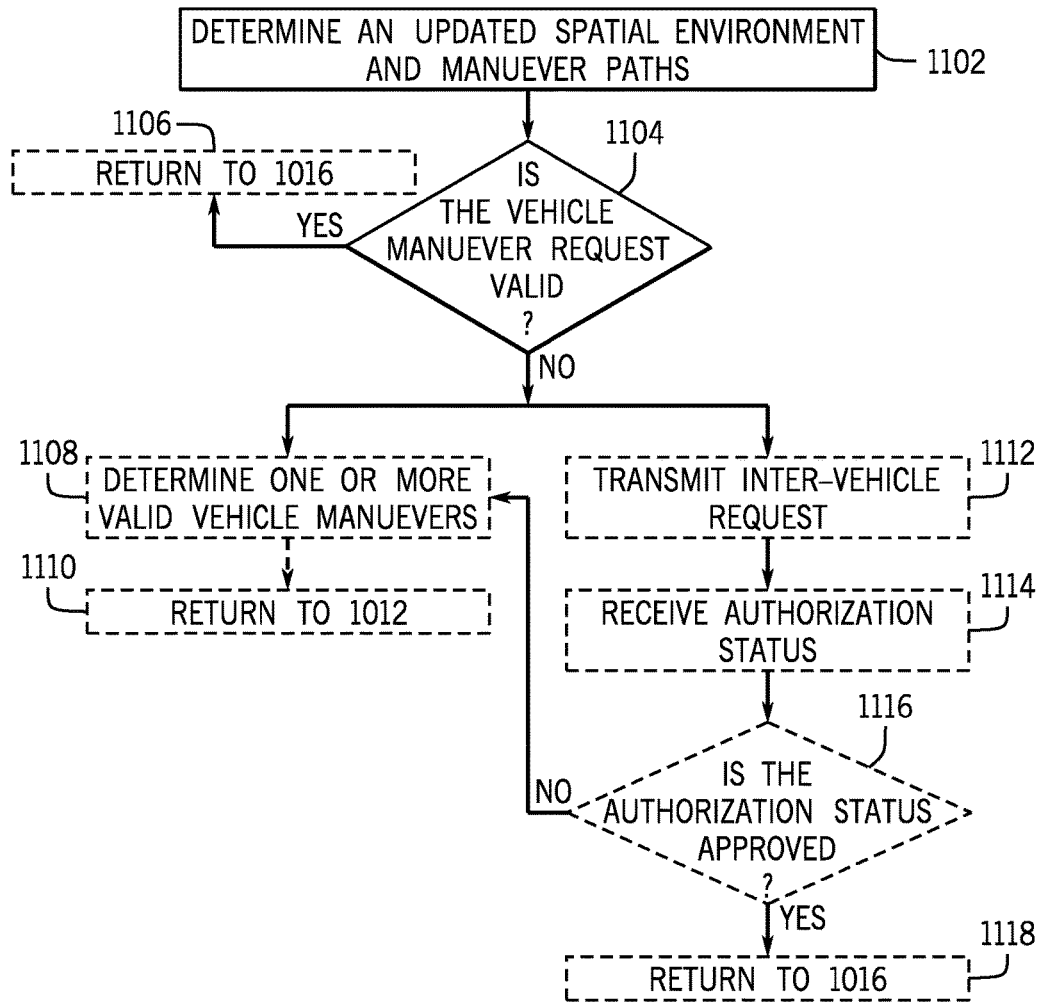
FIG. 11 is a flow chart diagram of an exemplary method for determining an availability status for dynamic in-vehicle virtual reality affecting real world driving according to one aspect of the present disclosure.

FIG. 11 is a flow chart diagram of an exemplary method for determining an availability status for dynamic in-vehicle virtual reality affecting real world driving according to one aspect of the present disclosure. At block 1102, the method can include determining an updated spatial environment and updated maneuver paths, similar to block 1002 of FIG. 10. In particular, in one embodiment, the virtual reality data module 302 can determine the availability status of the vehicle as valid or invalid by comparing the vehicle maneuver request to the spatial environment and maneuver paths (e.g., available and unavailable maneuver paths). Based on this determination, the virtual reality data module 302 can set an availability status parameter to valid or invalid. For example, referring again to FIG. 12B, a vehicle maneuver request of "Turn Left" is not available when compared with the spatial environment 1224 because of the oncoming vehicle 1216.

Referring to the illustrative example of FIG. 13A, the user has selected from menu 1304 the vehicle maneuver option of "Turn Right." Based on this user input, the virtual reality data module 302 generates a vehicle maneuver request (i.e., at block 1008). Then, at block 1016, the virtual reality data module 302 determines an availability status of the vehicle maneuver request. Here, the virtual reality data module 302 can compare the vehicle maneuver request to the spatial environment 1224 of FIG. 12B and other data describing the spatial environment 1224 (e.g., available maneuvers). In this example, the vehicle maneuver request "Turn Right" is valid, accordingly, the virtual reality data module 302 sets the availability status to "valid,"

Referring again to FIG. 11, at block 1104, the availability status parameter is evaluated to determine if the vehicle maneuver request is valid. If YES (e.g., availability status=valid), at block 1106, the method returns to block 1018 of FIG. 10. Referring again to FIG. 10, at block 1018, the method includes controlling one or more vehicle systems of the vehicle based on the vehicle maneuver request. In one embodiment, the dynamic virtual reality module 306 controls the one or more vehicle systems 118 of the vehicle based on at least one of the vehicle maneuver request. In particular, the dynamic virtual reality module 306 can generate a vehicle command based on at least one of the vehicle maneuver request, the available maneuvering space, and the availability status. The dynamic virtual reality module 306 can transmit the vehicle command to the one or more vehicle systems 118, wherein the one or more vehicle systems 118 implement the vehicle command.

Figure 13B:
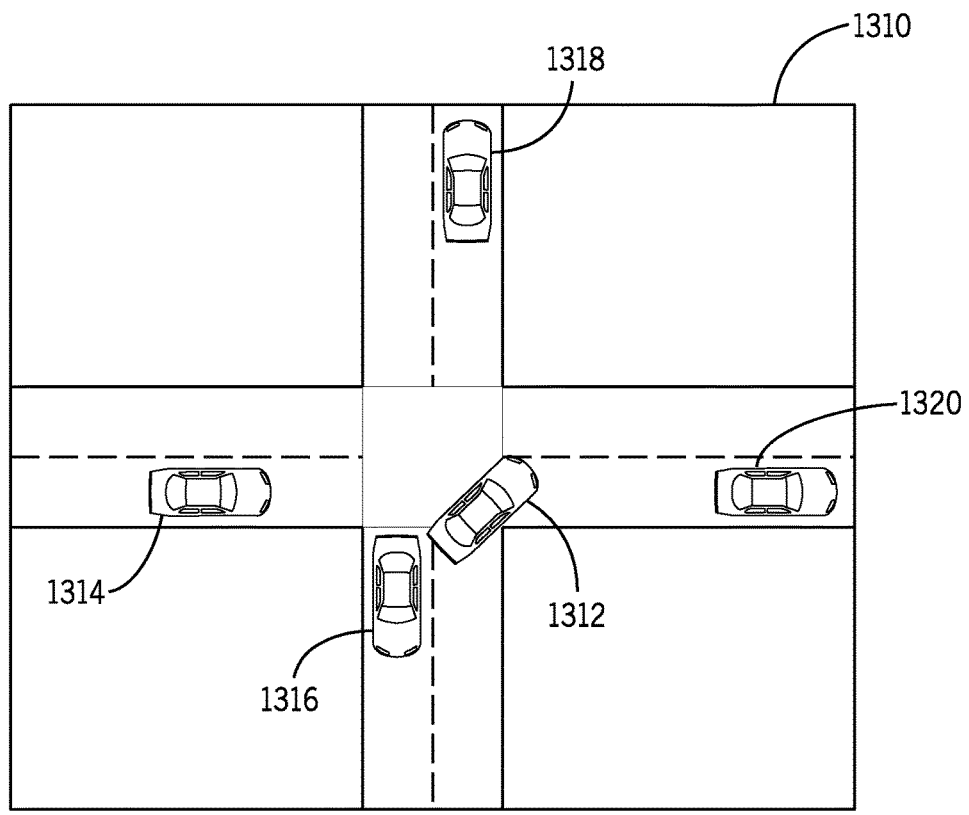
FIG. 13B is a schematic diagram of the street intersection of FIG. 12B after the vehicle maneuver request of FIG. 12A is applied to the vehicle according to one aspect of the present disclosure.

Referring again to the illustrative example, at block 1016 it is determined that the vehicle maneuver request (e.g., "Turn Right") is valid. Accordingly, at block 1018, the dynamic virtual reality module 306 controls the one or more vehicle systems 118 of the vehicle based on at least one of the vehicle maneuver request, thereby controlling the vehicle to turn right. For example, the dynamic virtual reality module 306 could control a steering system and braking system to implement the vehicle maneuver request with respect to the spatial environment 1224. Thus, FIG. 13B illustrates a schematic diagram of the street intersection of FIG. 12B after a vehicle maneuver is applied according to one embodiment.

Referring again to FIG. 10, at block 1020 the method includes updating a virtual view based on at least one of the vehicle maneuver request, the available maneuvering space and the availability status. Specifically, updating the virtual view includes augmenting one or more components of a virtual world model. The dynamic virtual reality module 306 can update the virtual view including augmenting one or more components of a virtual world model 310. In another embodiment, updating the virtual view includes adjusting a temporal-motion rendering speed based on the vehicle maneuver request.

As described in more detail above in Section B, the dynamic VR module 306 modifies and/or augments one or more components of the virtual world model 400 based on at least one of the vehicle data and the user data. In particular, the vehicle data and the user data now reflect the vehicle motion implemented by the vehicle maneuver request. Accordingly, as shown in FIG. 13A, updating the virtual view 1300 includes augmenting one or more component of the virtual world model associate with the virtual view 110, thereby the virtual view 110 reflects the changes in vehicle motion and user motion implemented by the vehicle maneuver request. Further, the virtual view is rendered to an output device. For example, the rendering module 308 can render the virtual view to the output device 124. As shown in FIG. 13A, a path of the ship 1302 reflects the vehicle maneuver request implemented, specifically, the ship 1302 has turned along a path to the right.

In one embodiment, rendering the virtual view to the output device is based on the temporal-motion rendering speed. As discussed in more detail above, the rendering module 308 determines a temporal-motion rendering speed based on the vehicle motion data and the user motion data. The temporal-motion rendering speed is a correlation between the vehicle motion data and the user motion data. Thus, for example, if the vehicle maneuver request includes a change in vehicle speed and/or motion, the temporal-motion rendering speed is changed accordingly. It is understood that blocks 1018 and 1020, in some embodiments can be executed in parallel or simultaneously. Therefore, the control on the vehicle is reflected in the virtual view at the same or approximately the same time.

Referring again to FIG. 11 and block 1104, if the vehicle maneuver request is determined to be invalid (e.g., availability status=invalid), the method can include at block 1108, determining one or more valid vehicle maneuvers. In this embodiment, the virtual reality data module 302 determines the one or more valid vehicle maneuvers based at least in part on the updated spatial environment and maneuver paths. In particular, the virtual reality data module 302 can determine which vehicle maneuvers are possible (e.g., available, valid) in the spatial environment. In one embodiment, the virtual reality data module 302 may automatically select at least one valid vehicle maneuver. In another embodiment, the virtual reality data module 302 with the rendering module 308 can render the one or more valid vehicle maneuvers to the output display, similar to the menu 1204 of FIG. 12A. In this embodiment, a user operating the output device 124, can select one or more of the valid vehicle maneuver options from the menu. The user input can be received by the virtual reality data module 302 via the output device and the virtual reality data module 302. Accordingly, at block 1018, controlling one or more vehicle systems is based at least upon the valid vehicle maneuver and, and at block 1020, updating a virtual view is based at least upon the valid vehicle maneuver.

In another embodiment, and referring again to block 1104 of FIG. 11, if the vehicle maneuver request is determined to be invalid (e.g., availability status=invalid), the method can include at block 1112, transmitting an inter-vehicle request based on the vehicle maneuver request to one or more vehicles in the spatial environment. The inter-vehicle request includes at least one or more vehicle commands for the one or more vehicles to allow the vehicle maneuver request. Accordingly, in this embodiment, a vehicle-to-vehicle (V2V) network is utilized to request other vehicles to shift paths in order for the vehicle maneuver request to be valid. The virtual reality data module 302 can transmit the inter-vehicle request using a V2V network, for example, the network 122.

As an illustrative example, and as discussed above, the vehicle maneuver request of "Turn Left" is determined to have an availability status of "invalid" based on the spatial environment 1224 of FIG. 12B. Thus, at block 1112, the dynamic virtual reality model can determine one or more vehicle commands for the one or more vehicle (e.g., vehicles 1206, 1208, 1219, 1212) to allow the vehicle maneuver request (e.g., thereby changing the availability status to "valid"). For example, and referring to FIG. 12B, the vehicle commands could include a command to vehicle 1216 to increase vehicle speed and a command to vehicle 1214 to increase vehicle speed. These vehicle commands would allow the vehicle 1212 to turn left safely without colliding with vehicles 1216 and 1214. Accordingly, the virtual reality data module 302 can transmit the inter-vehicle request to vehicles 1216 and 1214 using a V2V network.

At block 1114, the method includes receiving an authorization status in response to the inter-vehicle request from the one or more vehicles. This allows the other vehicles to approve or deny the request. At block 1116, the virtual reality data module 302, which can receive the authorization status in response to the inter-vehicle request from the one or more vehicles, determines if the authorization status has been approved. If yes, the method continues to block 1016, to determine an availability status. This ensures that if the other vehicles have approved and implemented the inter-vehicle request, then the available maneuvering space has changed and the vehicle maneuver request is now valid. Referring again to block 1116, if the authorization status is denied, the method can continue to block 1108 to determine one or more valid vehicle maneuvers, as discussed above.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for in-vehicle dynamic virtual reality, comprising:
   receiving vehicle data, user data, and a virtual world model and generating a virtual view based on the vehicle data, the user data, and the virtual world model, wherein the vehicle data includes an orientation, a location and a motion of a vehicle, wherein the user data includes an orientation, a location and a motion of a user, wherein the virtual world model includes one or more components that defines the virtual view;
   determining a temporal-motion rendering speed based on the vehicle data and the user data, wherein the temporal-motion rendering speed is a time-based correlation of differences between the orientation, the location and the motion of the user relative to the orientation, the location, and the motion of the vehicle;
   determining a spatial environment around the vehicle and maneuver paths for the vehicle in the spatial environment;
   updating the virtual view based on the spatial environment, the maneuver paths, and the temporal-motion rendering speed, wherein updating the virtual view includes augmenting the one or more components of the virtual world model to indicate the spatial environment and the maneuver paths, and rendering the virtual view to an output device;
   generating a vehicle maneuver request for the vehicle, wherein the vehicle maneuver request includes a desired vehicle maneuver and the vehicle maneuver request is based on the spatial environment;
   updating the virtual view based on the vehicle maneuver request, wherein updating the virtual view based on the vehicle maneuver request includes adjusting the temporal-motion rendering speed based on the vehicle maneuver request; and
   controlling one or more vehicle systems of the vehicle based on the vehicle maneuver request, wherein the one or more vehicle systems implement a vehicle command based on the vehicle maneuver request.

2. The computer-implemented method of claim 1, wherein updating the virtual view based on the spatial environment, the maneuver paths, and the temporal-motion rendering speed comprises augmenting the one or more components of the virtual world model to provide an indication that designates unavailable maneuver paths and a graphical pop-up user menu that illustrates at least one vehicle maneuver option that corresponds to a desired movement of a virtual object to affect movement of the vehicle.

3. The computer-implemented method of claim 1, wherein updating the virtual view based on the spatial environment, the maneuver paths, and the temporal-motion rendering speed comprises augmenting the one or more components of the virtual world model to provide an indication that designates available maneuver paths.

4. The computer-implemented method of claim 1, comprising determining the spatial environment around the vehicle and the maneuver paths for the vehicle based on the vehicle data, wherein the vehicle data is received from the one or more vehicle systems of the vehicle.

5. The computer-implemented method of claim 4, wherein the spatial environment around the vehicle and the maneuver paths for the vehicle are based on a future position of the vehicle.

6. The computer-implemented method of claim 1, comprising determining an availability status of the vehicle maneuver request based on the spatial environment and the maneuver paths.

7. The computer-implemented method of claim 6, wherein determining the availability status of the vehicle maneuver request comprises comparing the vehicle maneuver request that includes the desired vehicle maneuver to the spatial environment and maneuver paths and determining if the vehicle maneuver request is valid with respect to the spatial environment and the maneuver paths.

8. The computer-implemented method of claim 1, wherein the maneuver paths are at least one of an available maneuver path or an unavailable maneuver path.

9. The computer-implemented method of claim 1, wherein generating the vehicle maneuver request comprises generating the vehicle maneuver request based on a user input to the output device.

10. The computer-implemented method of claim 1, wherein generating the vehicle maneuver request comprises generating the vehicle maneuver request based on the virtual world model of the virtual view currently displayed on the output device.

11. A computing system for in-vehicle dynamic virtual reality, comprising:
    an output device for displaying a virtual view;
    a processor operably connected to the output device and a vehicle;
    a memory storing instructions that when executed by the processor cause the processor to:
    receive vehicle data, user data, and a virtual world model and generate the virtual view based on the vehicle data, the user data, and the virtual world model, wherein the vehicle data includes an orientation, a location and a motion of the vehicle, wherein the user data includes an orientation, a location and a motion of a user, wherein the virtual world model includes one or more components that defines the virtual view;
    determine a temporal-motion rendering speed based on the vehicle data and the user data, wherein the temporal-motion rendering speed is a time-based correlation of differences between the orientation, the location and the motion of the user relative to the orientation, the location, and the motion of the vehicle;

determine a spatial environment around the vehicle and maneuver paths for the vehicle in the spatial environment;

update the virtual view based on the spatial environment, the maneuver paths, and the temporal-motion rendering speed, wherein updating the virtual view includes augmenting the one or more components of the virtual world model to indicate the spatial environment and the maneuver paths, and a rendering module renders the virtual view to the output device;

generate a vehicle maneuver request for the vehicle, wherein the vehicle maneuver request includes a desired vehicle maneuver and the vehicle maneuver request is based on the spatial environment;

update the virtual view based on the vehicle maneuver request, wherein updating the virtual view based on the vehicle maneuver request includes adjusting the temporal-motion rendering speed based on the vehicle maneuver request; and control one or more vehicle systems of the vehicle based on the vehicle maneuver request, wherein the one or more vehicle systems implement a vehicle command based on the vehicle maneuver request.

12. The system of claim 11, wherein updating the virtual view based on the spatial environment, the maneuver paths, and the temporal-motion rendering speed comprises augmenting the one or more components of the virtual world model to provide an indication that designates unavailable maneuver paths and a graphical pop-up user menu that illustrates at least one vehicle maneuver option that corresponds to a desired movement of a virtual object to affect movement of the vehicle.

13. The system of claim 11, wherein updating the virtual view based on the spatial environment, the maneuver paths, and the temporal-motion rendering speed comprises augmenting the one or more components of the virtual world model to provide an indication that designates available maneuver paths.

14. The system of claim 11, comprising determining an availability status of the vehicle maneuver request based on the spatial environment and the maneuver paths, wherein determining the availability status of the vehicle maneuver request comprises comparing the vehicle maneuver request that includes the desired vehicle maneuver to the spatial environment and maneuver paths and determining if the vehicle maneuver request is valid or invalid with respect to the spatial environment and the maneuver paths.

15. The system of claim 14, wherein determining the availability status as valid or invalid includes comparing the vehicle maneuver request to the spatial environment and the maneuver paths.

16. The system of claim 15, comprising transmitting an inter-vehicle request based on the vehicle maneuver request to one or more vehicles in the spatial environment upon determining the availability status is invalid, the inter-vehicle request including one or more vehicle commands for the one or more vehicles to allow the vehicle maneuver request.

17. The system of claim 15, comprising receiving an authorization status in response to the inter-vehicle request from the one or more vehicles, and determining an updated spatial environment of the vehicle and the availability status of the vehicle maneuver request based on the updated spatial environment upon determining the authorization status is approved.

18. The system of claim 11, wherein the vehicle maneuver request includes a temporal parameter for executing the desired vehicle maneuver, and wherein the spatial environment and the maneuver paths are determined based on the temporal parameter.

19. A non-transitory computer-readable storage medium storing instructions that, when executed by a computer, causes the computer to perform a method comprising:

receiving vehicle data, user data, and a virtual world model and generating a virtual view based on the vehicle data, the user data, and the virtual world model, wherein the vehicle data includes an orientation, a location and a motion of a vehicle, wherein the user data includes an orientation, a location and a motion of a user, wherein the virtual world model includes one or more components that defines the virtual view;

determining a temporal-motion rendering speed based on the vehicle data and the user data, wherein the temporal-motion rendering speed is a time-based correlation of differences between the orientation, the location and the motion of the user relative to the orientation, the location, and the motion of the vehicle;

determining a spatial environment around the vehicle and maneuver paths for the vehicle in the spatial environment;

updating the virtual view based on the spatial environment, the maneuver paths, and the temporal-motion rendering speed, wherein updating the virtual view includes augmenting the one or more components of the virtual world model to indicate the spatial environment and the maneuver paths, and rendering the virtual view to an output device;

generating a vehicle maneuver request for the vehicle, wherein the vehicle maneuver request includes a desired vehicle maneuver and the vehicle maneuver request is based on the spatial environment;

updating the virtual view based on the vehicle maneuver request, wherein updating the virtual view based on the vehicle maneuver request includes adjusting the temporal-motion rendering speed based on the vehicle maneuver request; and controlling one or more vehicle systems of the vehicle based on the vehicle maneuver request, wherein the one or more vehicle systems implement a vehicle command based on the vehicle maneuver request.

* * * * *